(12) United States Patent
Crossdale et al.

(10) Patent No.: US 10,576,486 B2
(45) Date of Patent: Mar. 3, 2020

(54) FLUID DISPENSING APPARATUS AND METHOD

(71) Applicant: Diversey, Inc., Charlotte, NC (US)

(72) Inventors: Garry W. Crossdale, Derbyshire (GB); Andrew Swain, Nottinghamshire (GB); Martin Cooper, Leicester (GB); Michael H. Bertucci, Gurnee, IL (US); Barry Hague, South Yorkshire (GB); Guy Thornhill, Derby (GB)

(73) Assignee: Diversey, Inc., Fort Mill, SC (US)

( * ) Notice: Subject to any disclaimer, the term of this patent is extended or adjusted under 35 U.S.C. 154(b) by 0 days.

(21) Appl. No.: 16/037,749

(22) Filed: Jul. 17, 2018

(65) Prior Publication Data

US 2019/0015859 A1    Jan. 17, 2019

Related U.S. Application Data

(63) Continuation of application No. 14/987,456, filed on Jan. 4, 2016, now Pat. No. 10,022,739, which is a
(Continued)

(51) Int. Cl.
*B05B 11/00* (2006.01)
*B67B 7/00* (2006.01)
(Continued)

(52) U.S. Cl.
CPC ...... *B05B 11/3007* (2013.01); *B05B 11/0056* (2013.01); *B05B 11/0089* (2013.01);
(Continued)

(58) Field of Classification Search
CPC ............ B05B 11/3007; B05B 11/0056; B05B 11/0089
(Continued)

(56) References Cited

U.S. PATENT DOCUMENTS

| 1,913,062 A | 6/1933 | Wheeler |
| 2,517,161 A | 8/1950 | Anderson |
| (Continued) | | |

FOREIGN PATENT DOCUMENTS

| JP | S60-145252 | 9/1985 |
| JP | S60-184977 | 9/1985 |
| (Continued) | | |

OTHER PUBLICATIONS

International Search Report prepared by the Korean Intellectual Property Office.
(Continued)

*Primary Examiner* — Vishal Pancholi
(74) *Attorney, Agent, or Firm* — Michael Best & Friedrich LLP

(57) ABSTRACT

A fluid dispenser for containing and dispensing metered amounts of fluid that includes a reservoir for containing fluid and a chamber positioned substantially within the reservoir for containing a quantity of the fluid. The fluid dispenser additionally includes a piston that is moveable within the chamber to draw fluid into the chamber when the piston is moved in a first direction with respect to the chamber, and to discharge fluid from the chamber when the piston is moved in a second direction opposite the first direction. Further, the fluid dispenser includes a user-manipulatable control coupled to the piston and rotatable about an axis to select one of at least two different metered quantities of fluid to be dispensed. The user-manipulatable control is further movable to move the piston relative to the chamber along the axis to selectively dispense the selected metered quantity of fluid.

21 Claims, 31 Drawing Sheets

Related U.S. Application Data continuation of application No. 14/159,346, filed on Jan. 20, 2014, now Pat. No. 9,227,212, which is a continuation of application No. 12/663,145, filed as application No. PCT/US2008/066336 on Jun. 9, 2008, now Pat. No. 8,668,117.

(60) Provisional application No. 60/933,885, filed on Jun. 8, 2007, provisional application No. 61/023,158, filed on Jan. 24, 2008.

(51) Int. Cl.
*B67D 7/02* (2010.01)
*G01F 11/02* (2006.01)

(52) U.S. Cl.
CPC ...... *B05B 11/0097* (2013.01); *B05B 11/3005* (2013.01); *B05B 11/306* (2013.01); *B05B 11/3015* (2013.01); *B05B 11/3052* (2013.01); *B05B 11/3059* (2013.01); *B67B 7/24* (2013.01); *B67D 7/0227* (2013.01); *G01F 11/028* (2013.01)

(58) Field of Classification Search
USPC ............ 222/43, 153.13, 287, 288, 309, 380, 222/383.1, 384, 385, 387, 478; 73/864.16, 864.18
See application file for complete search history.

(56) References Cited

U.S. PATENT DOCUMENTS

| | | | |
|---|---|---|---|
| 3,143,252 A | 8/1964 | Shapiro | |
| 3,191,807 A | 6/1965 | Rodrigues, Jr. | |
| 3,430,813 A | 3/1969 | Gilmont | |
| 3,452,901 A | 7/1969 | Roach | |
| 3,729,022 A | 4/1973 | Roach | |
| 3,863,807 A | 2/1975 | Shapiro et al. | |
| 3,923,205 A | 12/1975 | Ohlin | |
| 3,987,934 A | 10/1976 | Reed et al. | |
| 4,057,174 A | 11/1977 | Trujillo | |
| 4,072,247 A | 2/1978 | Yamazaki | |
| 4,074,831 A | 2/1978 | Roach | |
| 4,099,548 A | 7/1978 | Sturm et al. | |
| 4,210,261 A | 7/1980 | Trujillo et al. | |
| 4,238,052 A | 12/1980 | Trujillo | |
| 4,273,257 A | 6/1981 | Smith et al. | |
| 4,306,670 A | 12/1981 | Oshikubo | |
| 4,368,830 A | 1/1983 | Soughers | |
| 4,526,294 A | 7/1985 | Hirschmann et al. | |
| 4,749,112 A | 6/1988 | Harper | |
| 4,883,204 A | 11/1989 | Kay et al. | |
| 4,966,308 A | 10/1990 | Strazdins | |
| 5,016,780 A | 5/1991 | Moretti | |
| 5,050,782 A | 9/1991 | Cheng | |
| 5,622,287 A | 4/1997 | Glynn | |
| 5,624,059 A | 4/1997 | Lo | |
| 5,672,320 A | 9/1997 | Ritter | |
| 5,725,128 A | 3/1998 | Foster | |
| 5,726,363 A | 3/1998 | Kalidindi | |
| 5,747,709 A | 5/1998 | Oshikubo | |
| 5,826,756 A | 10/1998 | Foster | |
| 5,827,486 A | 10/1998 | Crossdale | |
| 5,842,605 A | 12/1998 | Lehmkuhl | |
| 5,862,958 A | 1/1999 | Edwards et al. | |
| 5,908,143 A | 6/1999 | Crossdale et al. | |
| 5,908,163 A | 6/1999 | Wells | |
| 5,947,332 A | 9/1999 | Kilma, Jr. et al. | |
| 5,947,335 A | 9/1999 | Milio et al. | |
| 5,988,449 A | 11/1999 | Funchs et al. | |
| 6,045,008 A | 4/2000 | Gonzalez Fernandez et al. | |
| 6,253,957 B1 | 7/2001 | Messerly et al. | |
| 6,295,880 B1 | 10/2001 | Gilson | |
| 6,443,331 B1 | 9/2002 | DeJonge | |
| 6,481,596 B1 | 11/2002 | Rusnak | |
| 6,568,438 B2 | 5/2003 | Crossdale et al. | |
| 6,681,962 B2 | 1/2004 | Masuda | |
| 6,695,175 B2 | 2/2004 | Martin et al. | |
| 6,770,056 B2 | 8/2004 | Price et al. | |
| 6,772,914 B2 | 8/2004 | Hubmann et al. | |
| 6,910,606 B2 | 6/2005 | Martin et al. | |
| 8,668,117 B2 | 3/2014 | Crossdale et al. | |
| 9,227,212 B2 | 1/2016 | Crossdale et al. | |
| 2007/0194050 A1 | 8/2007 | Krampen et al. | |

FOREIGN PATENT DOCUMENTS

| | | |
|---|---|---|
| JP | H07-503689 | 4/1995 |
| JP | 2000-142764 | 5/2000 |
| JP | 2001-087682 | 4/2001 |
| KR | 200238764 | 10/2001 |
| KR | 200383181 | 5/2005 |
| WO | 2003048002 | 6/2003 |
| WO | 2008154498 | 12/2008 |

OTHER PUBLICATIONS

Office Action from Japanese Patent Office for Application No. 2013-108496 dated Jan. 20, 2014 (7 pages).
Notice of Preliminary Rejection with English translation from the Korean Intellectual Property Office dated Oct. 17, 2014 (7 pages).
Office Action from the Canadian Intellectual Property Office for Application No. 2,689,520 dated Apr. 10, 2014 (3 pages).

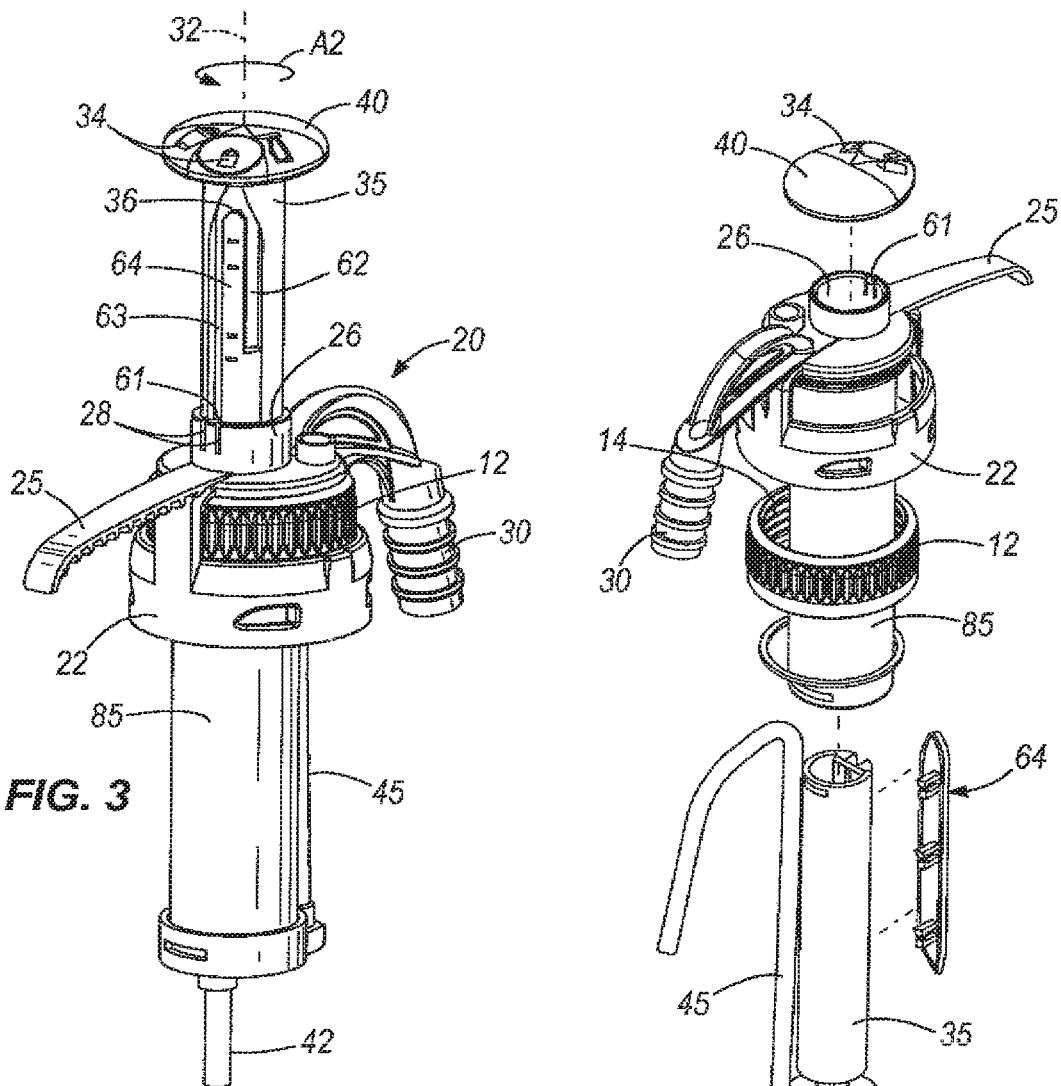
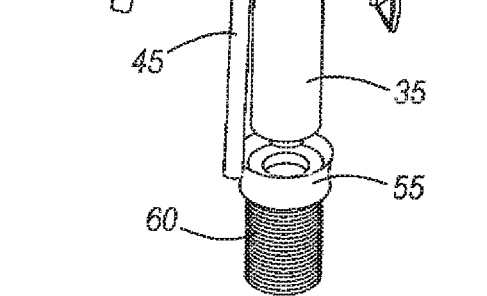
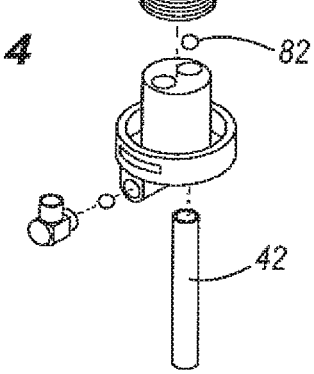
FIG. 3
FIG. 4

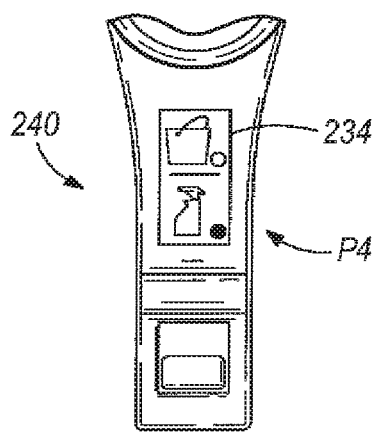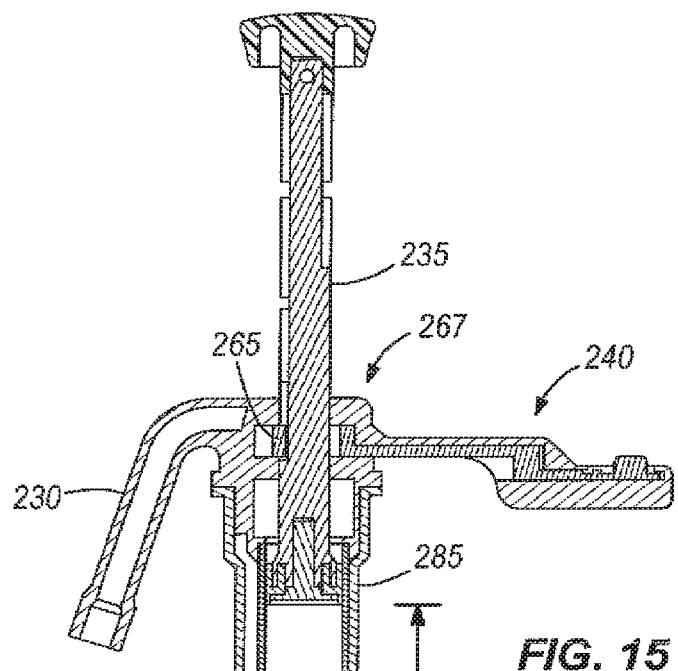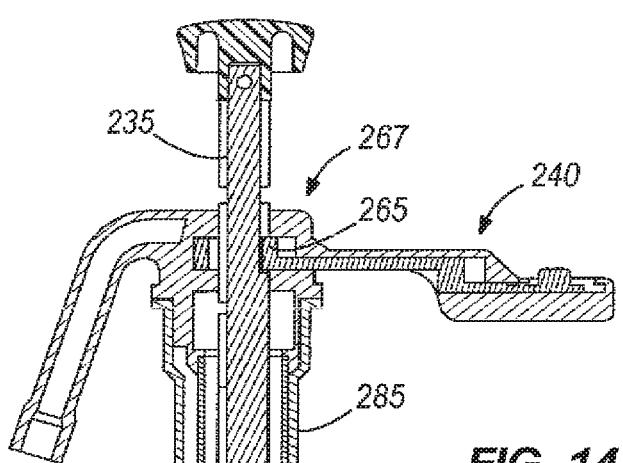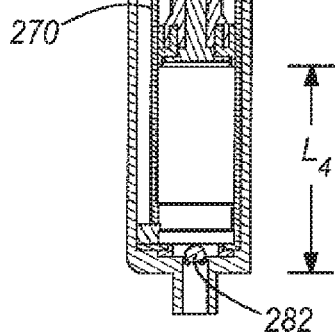
FIG. 11
FIG. 15
FIG. 14

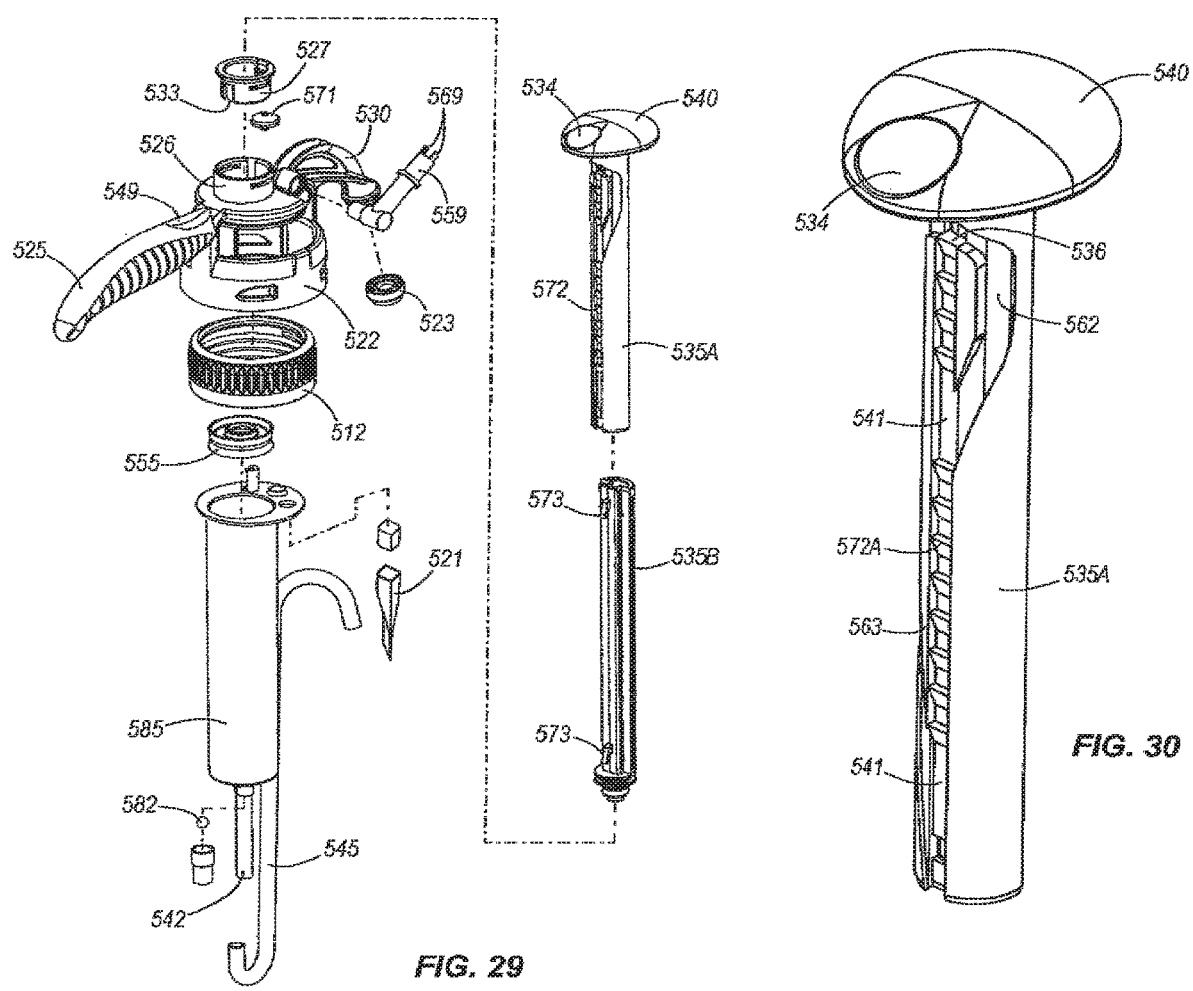

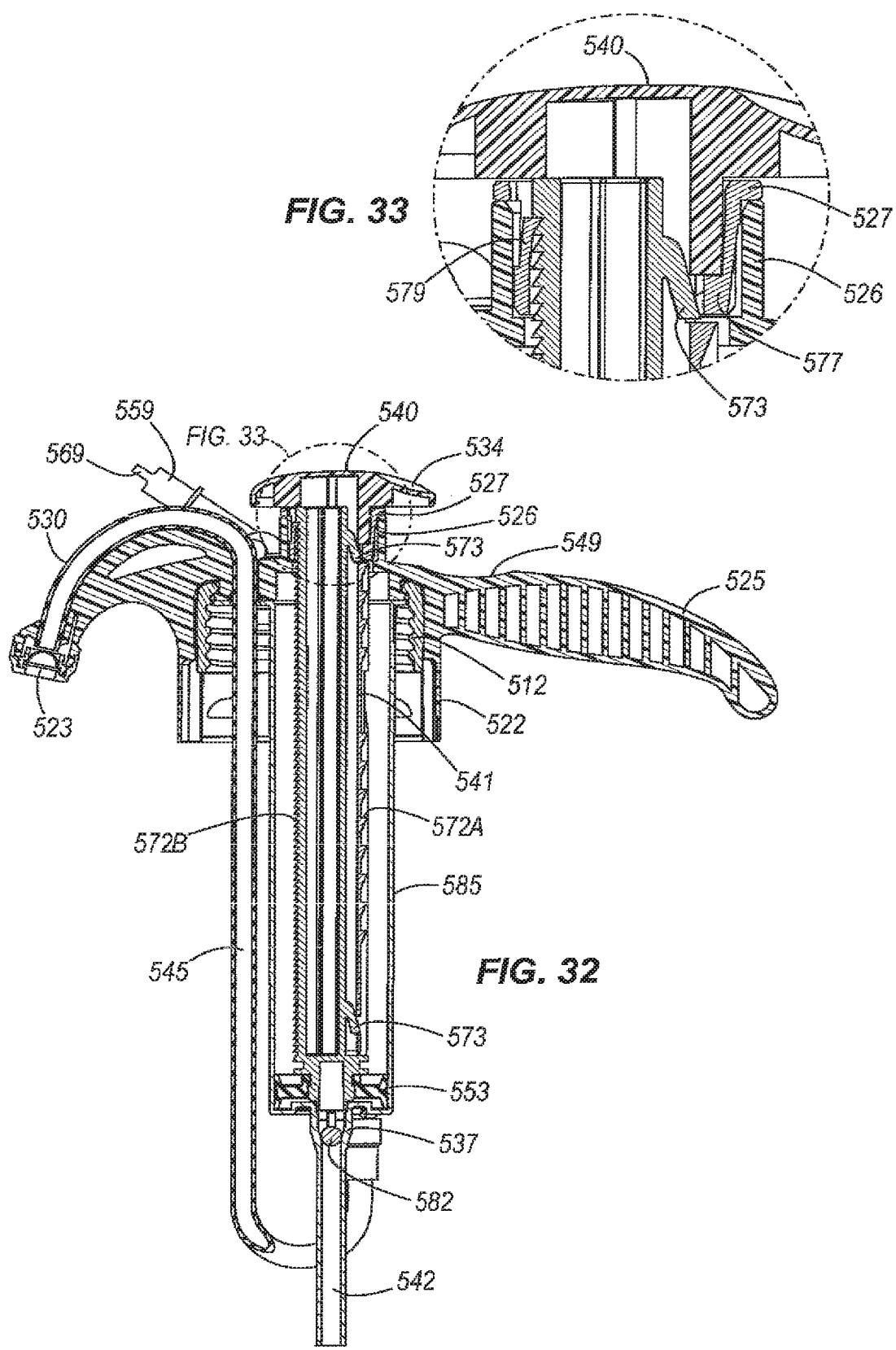

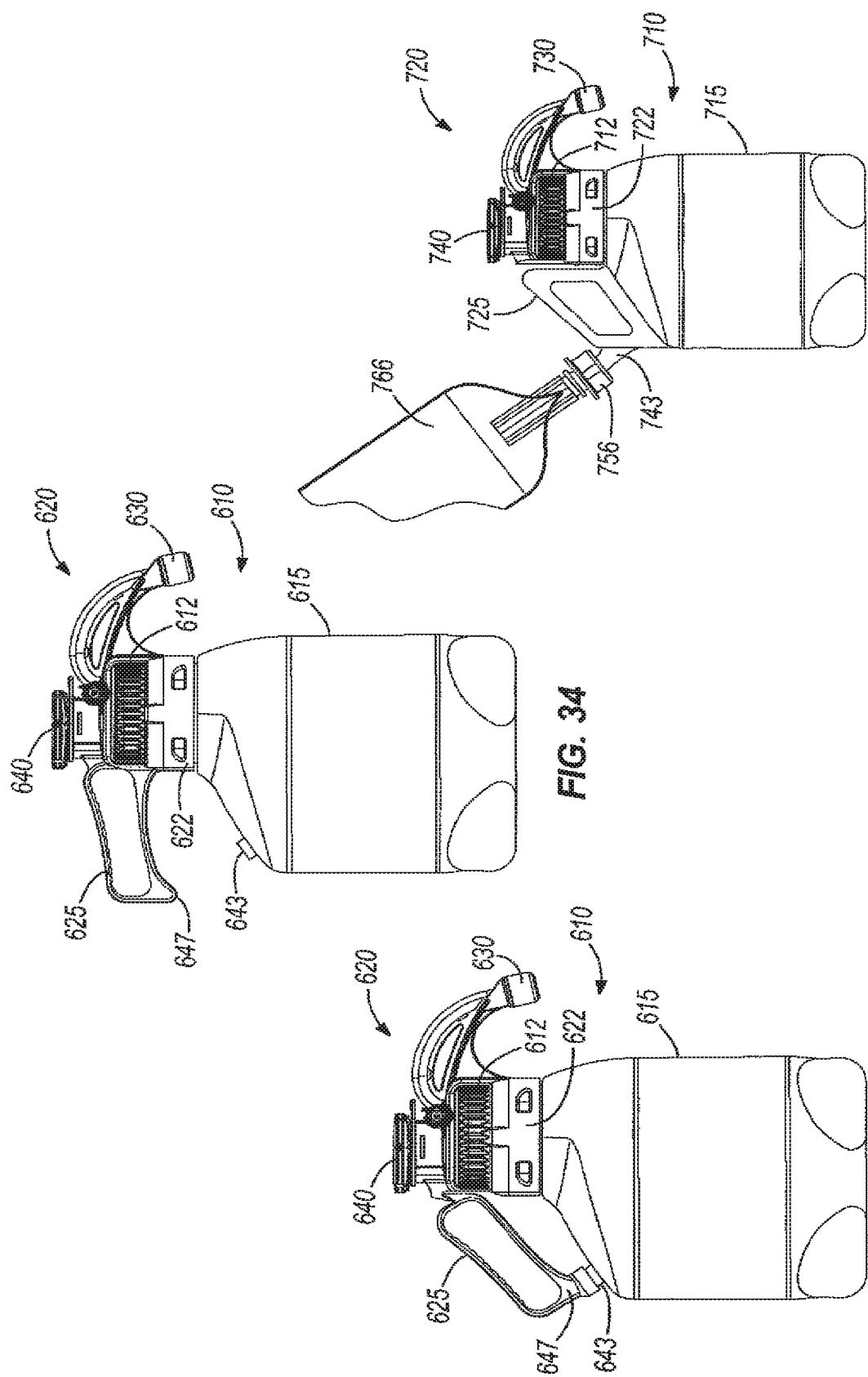

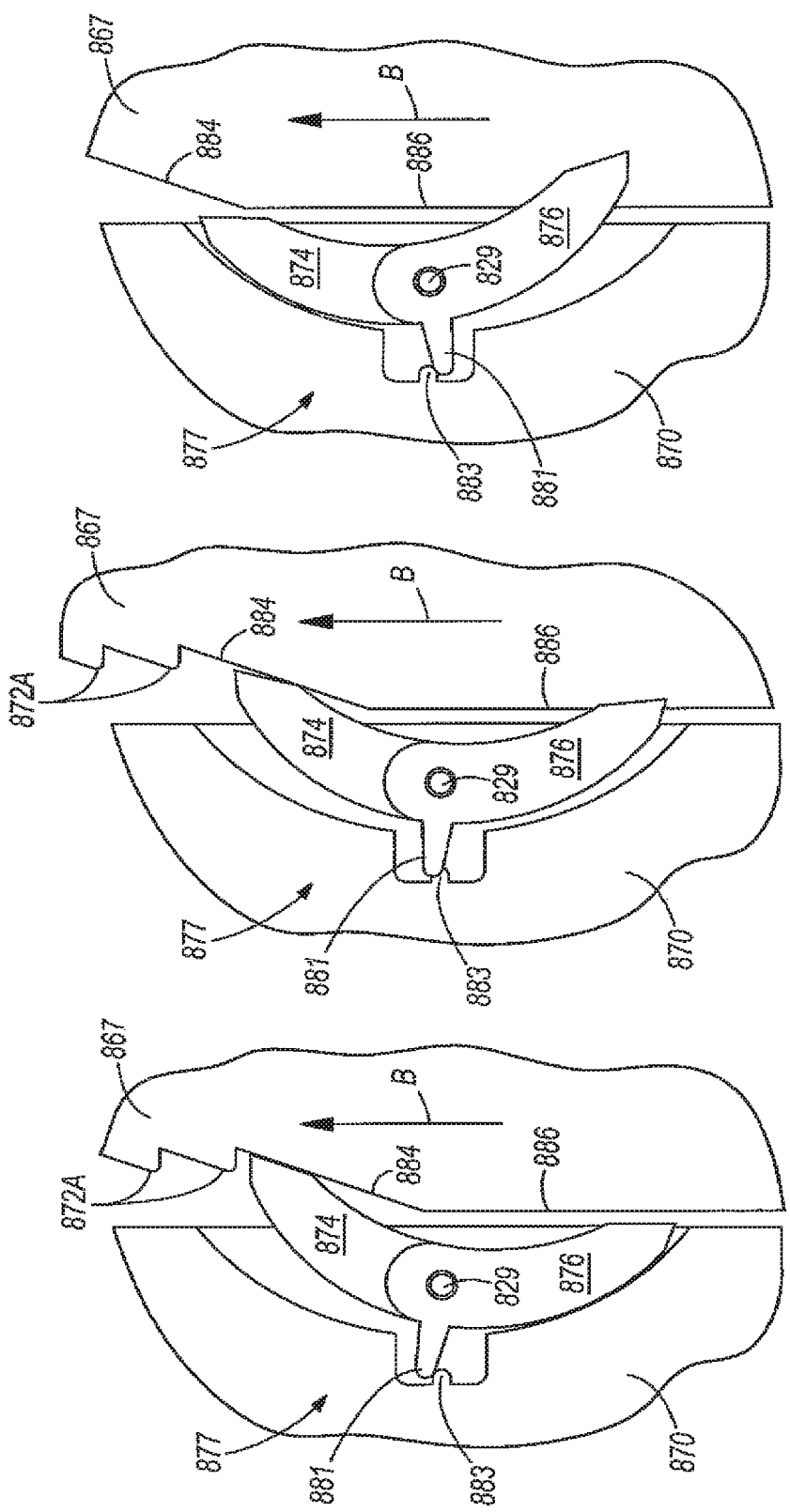

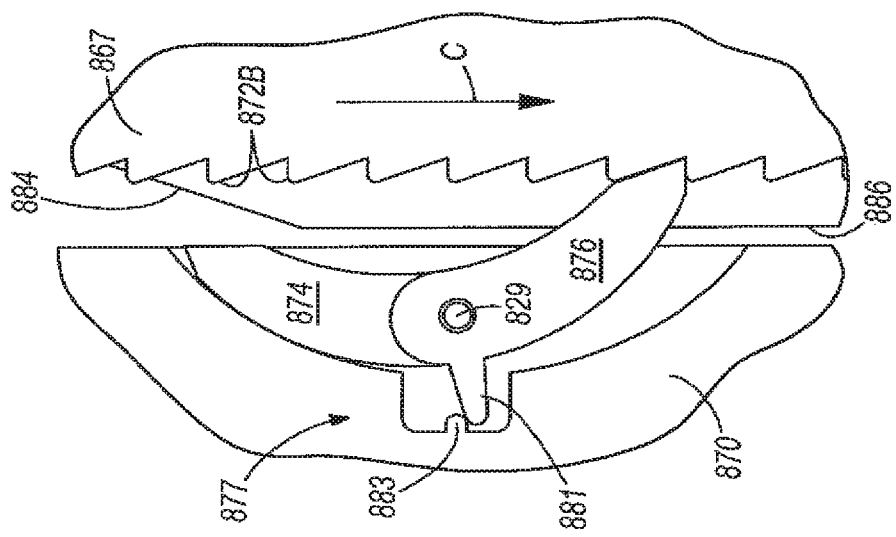
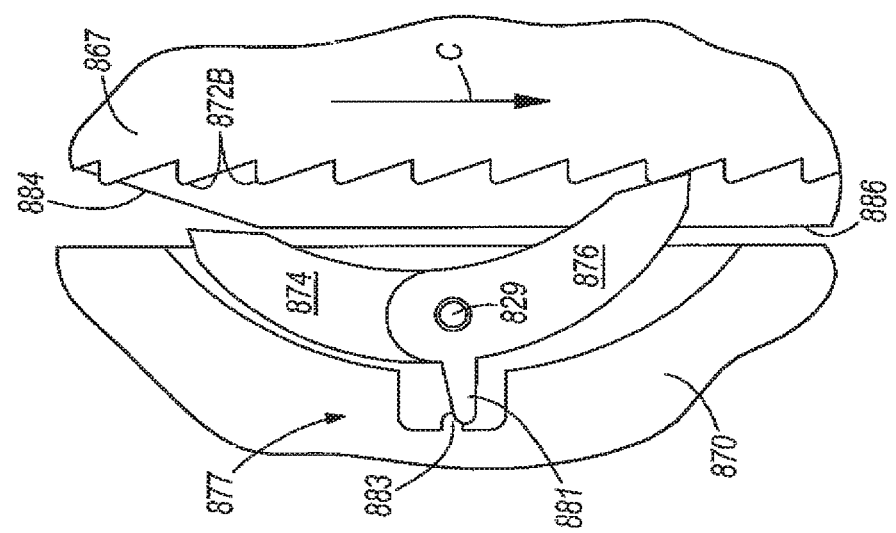
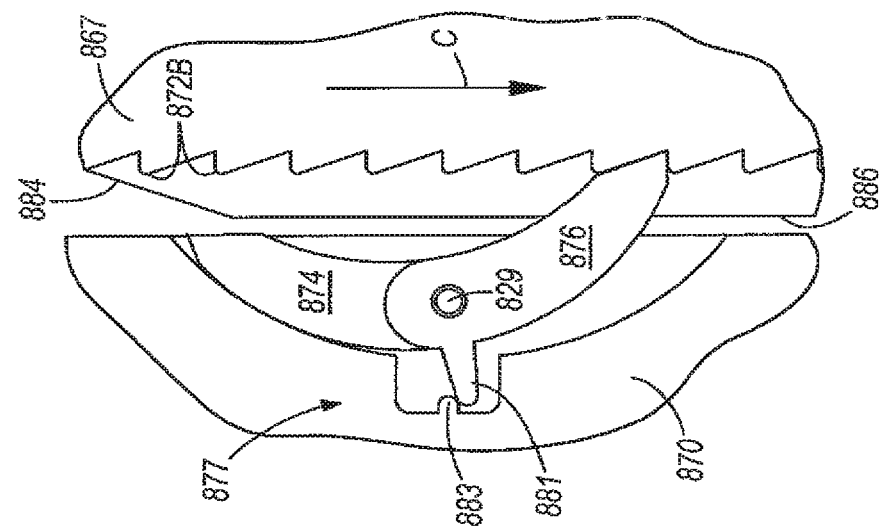

FLUID DISPENSING APPARATUS AND METHOD

CROSS-REFERENCE TO RELATED APPLICATIONS

This application is a continuation application of U.S. patent application Ser. No. 14/987,456 filed on Jan. 4, 2016, which is a continuation application of U.S. patent application Ser. No. 14/159,346 filed on Jan. 20, 2014, now U.S. Pat. No. 9,227,212, which is a continuation application of U.S. patent application Ser. No. 12/663,145 filed on Jan. 25, 2010, now U.S. Pat. No. 8,668,117, which is a national stage entry of PCT Application No. PCT/US08/66336 filed on Jun. 9, 2008 and published as U.S. Patent Publication No. WO2008/154498, which claims priority to U.S. Provisional Patent Application No. 60/933,885 filed on Jun. 8, 2007 and U.S. Provisional Patent Application No. 61/023,158 filed on Jan. 24, 2008, the entire contents of each is incorporated herein by reference.

BACKGROUND

A number of apparatuses exist for dispensing fluid in various quantities. Such fluid dispensers can dispense fluid of any type, such as cleaning chemicals, floor and other surface treatment fluids, comestible fluids, body sprays, oils, coolants, and other automotive, heat exchange, and/or lubricant fluids, chemical additives, paint, colorants, and the like. Also, many of these dispensers are portable, thereby enabling a user to transport such dispensers to different desired locations for fluid dispense. In some cases, the dispensers are used to dispense a quantity of fluid onto a surface, such as a surface to be cleaned or treated, whereas some dispensers can instead be used to dispense a quantity of fluid into a fluid container (e.g., bottle, sink, bucket, tank, and the like). To this end, such dispensers can include a fluid reservoir for carrying fluid to be dispensed, or can be connected to and receive fluid from a fluid reservoir through one or more hoses or other conduits.

In many applications, it is important for a fluid dispenser to dispense a metered or otherwise known dose of fluid when actuated. Such applications include the dispense of hazardous chemicals, and the use of predetermined fluid amounts for proper mixing ratios with one or more other fluids, including diluents.

It is also often desirable to control or prevent the ability of a user to refill a container of the fluid dispenser, or the ability to replace a fluid reservoir of the fluid dispenser with another fluid reservoir. For example, there are many existing products that use a connecting device that is non-removably attached to a fluid reservoir. The ability to use a fluid dispenser with products or chemicals for which it was not produced or designed is not always advantageous or desirable. In this regard, the use of a fluid dispenser with the wrong product can cause a number of problems, including dispenser leakage, failure, improper dispense amount, and even property damage and user injury as a result of incorrect dispense. Container refill control or prevention can reduce the risk of user contact with hazardous fluids dispensed by the fluid dispenser and/or retained in a fluid reservoir thereof, can prevent a user from using a fluid dispenser to dispense a fluid for which the fluid dispenser is not adapted or suitable, and can reduce the potential of health, safety, and/or other liability risks when a user uses one party's fluid dispenser to dispense fluid obtained from another party.

In light of the rapidly-developing uses and applications of fluid dispensers, it will be appreciated that fluid dispensers that are portable, are capable of dispensing two or more different amounts of fluid, prevent incorrect fluid dispense amounts, are resistant to refilling efforts, and/or are adapted to reduce opportunities for human contact with the fluid are welcome to the industry.

SUMMARY

Some embodiments of the present invention provide a fluid dispenser for containing and dispensing metered amounts of fluid, wherein the fluid dispenser comprises a reservoir for containing fluid; a chamber positioned substantially within the reservoir for containing a quantity of the fluid; a piston moveable within the chamber to draw fluid into the chamber when the piston is moved in a first direction with respect to the chamber, and to discharge fluid from the chamber when the piston is moved in a second direction opposite the first direction; a user-manipulatable control coupled to the piston and movable to move the piston with respect to the chamber; and a pawl movable with respect to the piston to selectively permit and inhibit movement of the piston in at least one of the first and second directions.

In some embodiments, a fluid dispenser for containing and dispensing fluid and for refill from a source of fluid is provided, and comprises a reservoir for containing fluid; a chamber positioned substantially within the reservoir for containing a quantity of the fluid; a piston moveable within the chamber to draw fluid into the chamber when the piston is moved in a first direction with respect to the chamber, and to discharge fluid from the chamber when the piston is moved in a second direction opposite the first direction; a user-manipulatable control operable to move the piston within the chamber; a cap coupled to the reservoir and defining a vent establishing fluid communication between an interior and exterior of the reservoir; a valve for selective fluid communication between an interior of the reservoir and the source of fluid, the valve having an open position to permit fluid flow therethrough, and a closed position to inhibit fluid flow therethrough; and a plug coupled to the cap and insertable into the vent to selectively close the vent responsive to movement of the valve.

Some embodiments of the present invention provide a method of dispensing fluid from a reservoir in metered quantities, wherein the method comprises selecting a desired quantity of fluid to be dispensed from the reservoir from a plurality of quantities; moving a user-manipulatable control to a first of a plurality of positions; moving a piston in a first direction with respect to a chamber for a first distance corresponding to the desired quantity of fluid; drawing fluid into the chamber by moving the piston in the first direction for the first distance; resisting movement of the piston in a second direction opposite the first direction prior to the first distance being reached; moving the piston with respect to the chamber in the second direction; and dispensing the desired quantity of fluid from the chamber by moving the piston in the second direction.

Some embodiments of the present invention provide a fluid dispenser for containing and dispensing metered amounts of fluid that includes a reservoir for containing fluid and a chamber positioned substantially within the reservoir for containing a quantity of the fluid. Additionally, the fluid dispenser includes a piston that is moveable within the chamber to draw fluid into the chamber when the piston is moved in a first direction with respect to the chamber, and to discharge fluid from the chamber when the piston is moved in a second direction opposite the first direction. The fluid dispenser further includes a user-manipulatable control coupled to the piston and rotatable about an axis to select one of at least two different metered quantities of fluid to be dispensed. The user-manipulatable control is further movable to move the piston relative to the chamber along the axis to selectively dispense the selected metered quantity of fluid.

Some embodiments of the present invention provide a fluid dispenser for containing and dispensing metered amounts of fluid that includes a reservoir for containing fluid and a chamber positioned substantially within the reservoir for containing a quantity of the fluid. The fluid dispenser also includes a piston moveable within the chamber to draw fluid into the chamber when the piston is moved in a first direction with respect to the chamber, and to discharge fluid from the chamber when the piston is moved in a second direction opposite the first direction. Additionally, the fluid dispenser includes a user-manipulatable control rotatable to different circumferential positions about an axis extending along the piston to select one of at least two different metered quantities of fluid to be dispensed.

Some embodiments of the present invention provide a method of dispensing fluid from a reservoir in metered quantities. The method includes rotating a user-manipulatable control about an axis to one of a plurality of circumferential positions to select one of at least two different metered quantities of fluid to be dispensed. The method further includes moving a piston in a first direction within a chamber in communication with the reservoir, and drawing fluid into the chamber in response to moving the piston in the first direction. Additionally, the method includes moving the piston in a second direction different from the first direction, and discharging fluid from the chamber in response to moving the piston in the second direction.

Other aspects of the invention will become apparent by consideration of the detailed description and accompanying drawings.

BRIEF DESCRIPTION OF THE DRAWINGS

FIG. 3 is a perspective view of a portion of the fluid dispenser illustrated in FIG. 1, shown with the pump of the apparatus in a first position.

FIG. 4 is an exploded perspective view of the portion of the fluid dispenser shown in FIG. 3.

FIG. 11 is a top detail view of the fluid dispenser illustrated in FIGS. 9 and 10.

FIG. 14 is a cross-sectional view of the fluid dispenser illustrated in FIGS. 9-13A, shown with the pump in a first position.

FIG. 15 is a cross-sectional view of the fluid dispenser illustrated in FIGS. 9-13A, shown with the pump in a second position.

FIG. 29 is an exploded perspective view of a fluid dispenser according to another embodiment of the present invention.

FIG. 30 is a perspective view of the piston shown in FIG. 29.

FIG. 32 is a cross sectional view of the fluid dispenser shown in FIGS. 29-31, taken along line 32-32 of FIG. 31.

FIG. 33 is a detail view of a portion of FIG. 32.

FIG. 34 is a side view of a fluid dispenser having a refill port according to another embodiment of the present invention.

FIG. 35 is a side view of the dispenser of FIG. 34, shown with the refill port in a closed position.

FIG. 36 is a side view of a fluid dispenser having a refill port according to another embodiment of the present invention.

FIGS. 39A-39C are side views of the pawl assembly of FIGS. 37A-38C, shown in different positions in response to further movement of the pawl in the first direction.

FIGS. 40A-40C are side views of the pawl assembly of FIGS. 37A-39C, shown in different positions in response to movement of the pawl in a second direction opposite the first direction.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
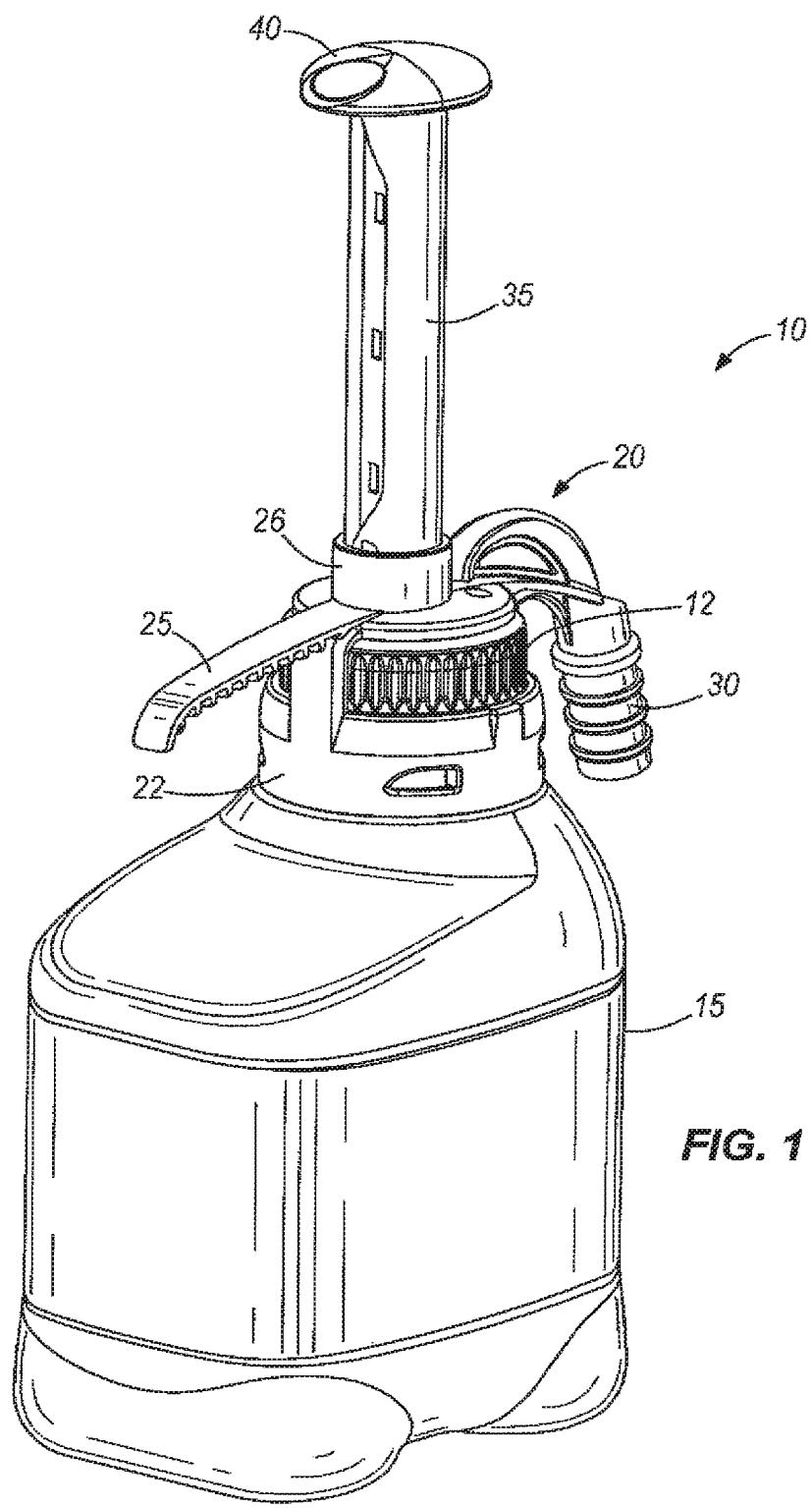
FIG. 1 is a perspective view of a fluid dispenser according to an embodiment of the present invention.
Figure 2:
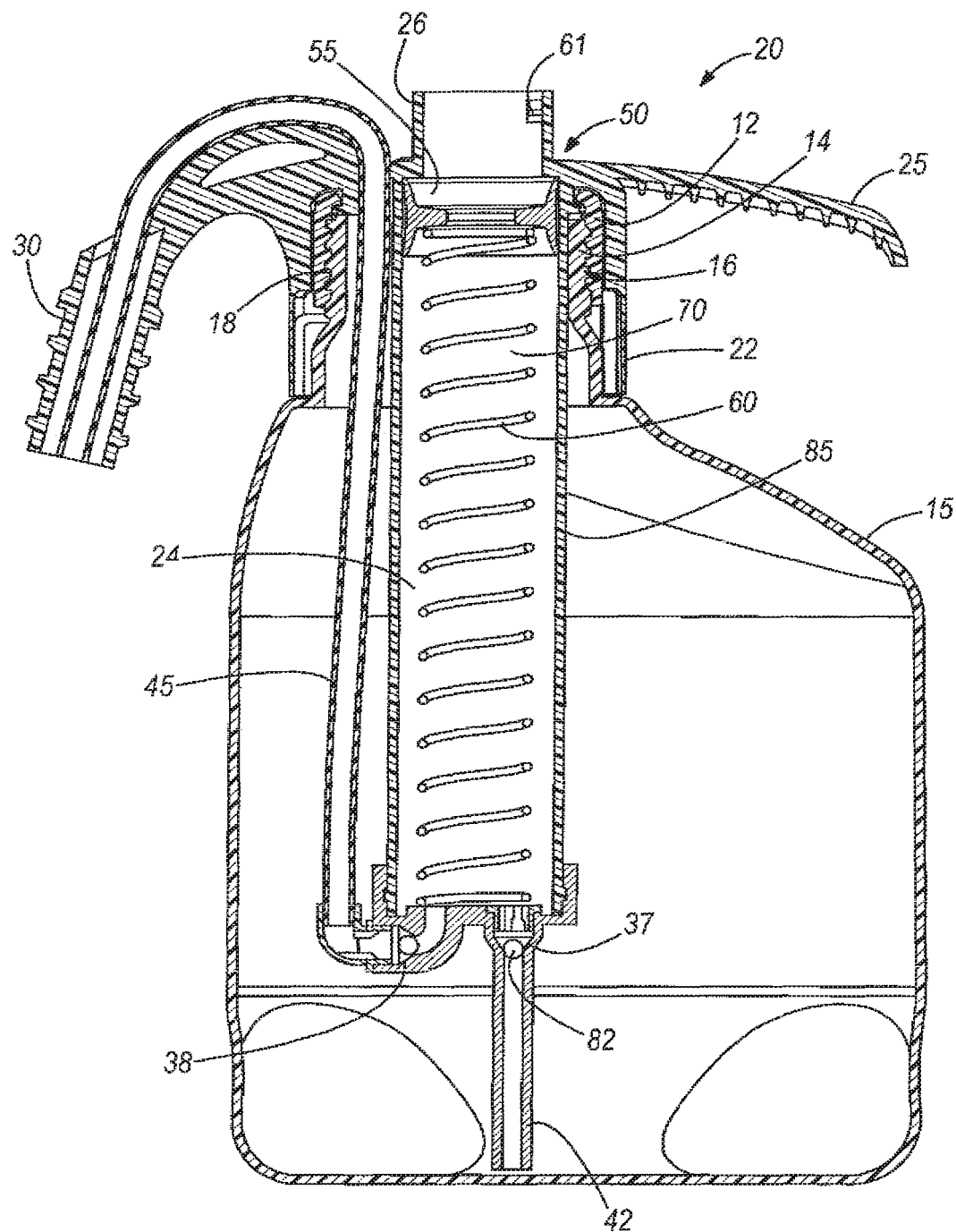
FIG. 2 is a cross-sectional view of the fluid dispenser illustrated in FIG. 1, shown with a piston of the pump removed.
Figure 5:
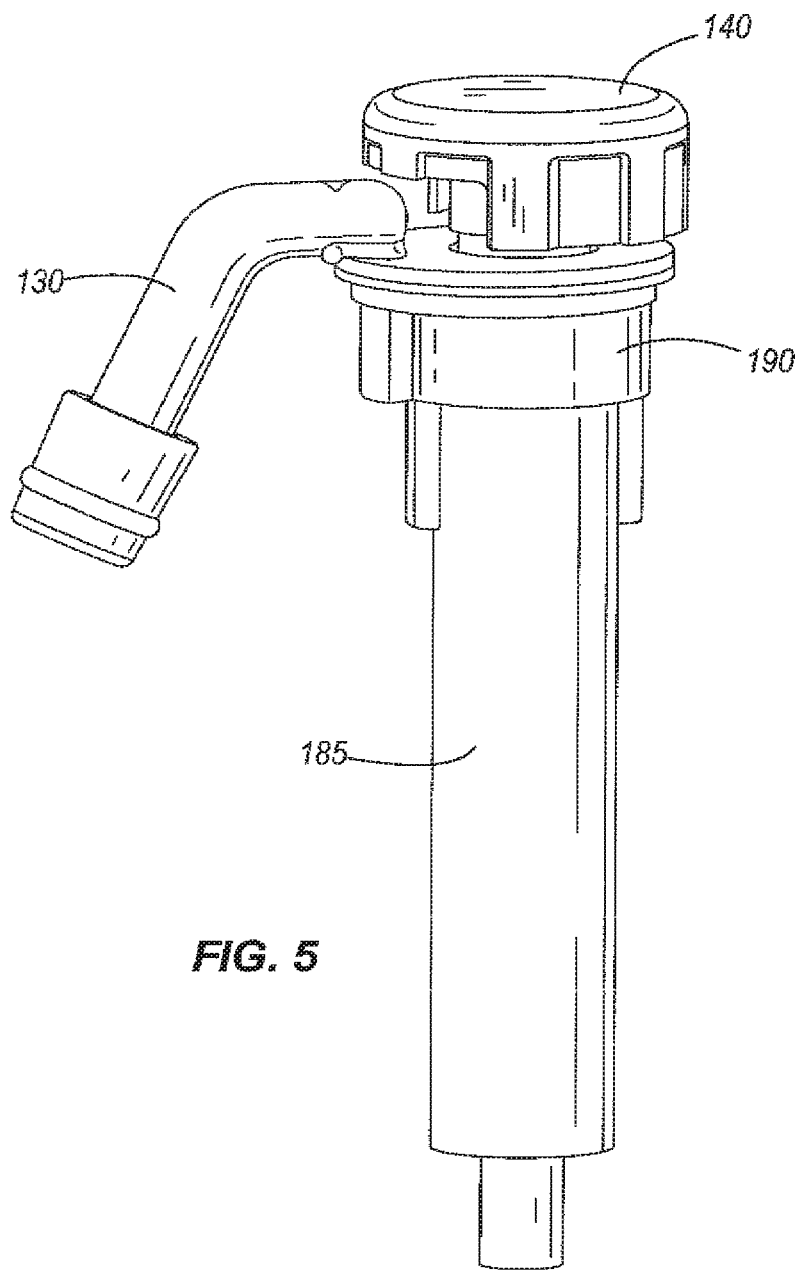
FIG. 5 is a perspective view of a fluid dispenser according to another embodiment of the present invention, shown disconnected from a bottle.

FIG. 1 illustrates a fluid dispenser 10 according to an embodiment of the present invention. The fluid dispenser 10 includes a bottle 15 and a pump 20 having a piston 35. In some embodiments, the fluid dispensing apparatus 10 also includes a handle 25 and/or a spout 30 of any form desired, such as those shown by way of example in FIGS. 1-4. The illustrated fluid dispenser of FIG. 1 also includes a user-manipulatable control 40 for selecting an amount of fluid to be dispensed upon actuation of the piston 35. Although other embodiments of the present invention need not necessarily have a user-manipulatable control 40, such a control increases the flexibility of the fluid dispenser 10, as will be described in greater detail below.

As with the other fluid dispensers 10 illustrated in the figures, the fluid dispenser 10 illustrated in FIGS. 1-4 is portable, and is intended to be movable from location to location as needed for dispensing fluid at such locations. The fluid dispenser 10 can also be mounted in a wall rack or refilling station to prevent misplacement or theft, and/or to provide a central identified and controlled location for dispensing operations. The dispenser 10 can have any of the features of the dispensers described in U.S. Pat. Nos. 5,827,486, 5,908,143, and 6,568,438, the entire contents of which are incorporated herein by reference insofar as they relate to fluid dispensers, fluid dispenser components, and manners in which fluid dispensers can be mounted.

The fluid dispenser 10 illustrated in FIGS. 1-4 is operable to draw fluid from within the bottle 15 by actuating the piston 35 of the pump 20 in a first direction, and to dispense a particular quantity of the fluid (i.e., a predetermined, metered, or dosed amount) through the spout 30 by actuating the piston 35 in a second direction. Any type of fluid can be retained within and dispensed from the fluid dispenser 10, such as cleaning chemicals, disinfectants, floor and other surface treatment fluids, comestible fluids, body sprays, oils, coolants, and other automotive, heat exchange, and/or lubricant fluids, chemical additives, paint, colorants, and the like.

In many applications, access to the interior of the bottle 15 (whether for purposes of refilling the bottle 15 or access to fluid therein) is undesirable. Also, in many applications, the ability to remove and replace the bottle 15 with another bottle of the same or different type is undesirable. In practice, the pump 20 can have a limited life and can therefore eventually fail; by designing the pump 20 with a life of the usage of the bottle 15 plus a safety margin, it is possible to prevent potential hazards and user frustration of the pump 20 failing in use. Therefore, in some embodiments, the pump 20 is non-removably connected to the bottle 15. This connection is fluid-tight in some embodiments, and can be established in a number of different manners, such as by spin-welding, vibration welding, or welding in any other manner, adhesive or cohesive bonding material, a non-releasable mechanical connection such as a toothed, swaged, or non-reversible threaded locking engagement, or a combination of these and other types of non-releasable connections. Any of these and other types of non-releasable connections between the pump 20 and the bottle 15 are possible, and can be defined between a portion of the bottle 15 (e.g., a neck, peripheral lip, or other fitting or feature adjacent or defining an opening of the bottle 15) and a portion of the pump 20 (e.g., a cap, cover, tube, shunt, or other fitting or feature of the pump 20). By way of example only, the non-releasable fitting illustrated in FIGS. 1-4 is described and illustrated in detail in U.S. Pat. No. 6,772,914, which is incorporated herein by reference for its teachings of bottle-to-pump connections and connection methods. In this regard, the illustrated cap 12 with internal threads 14 is threaded upon a neck 16 of the bottle 15 having external threads 18 (although the internal/external locations of the threads 14, 18 can be reversed in other embodiments). In the illustrated embodiment, the cap 12 is received within a portion of a pump body 22, and can spin relative to the pump body 22 and bottle 15 in order to tighten the cap 12 thereon. In other embodiments, the pump 20 is releasably connected to the bottle 15 in any manner, such as by a fluid-tight reversible threaded connection, snap-fit connection, and the like.

The bottle 15 and pump 20 (and pump components, described in greater detail below) can be made from any resilient material or combination of materials, such as plastic, elastomer, fiberglass, composite material, aluminum, steel or other metal, and the like. Also, the bottle 15 and pump 20 can be formed by injection molding, blow molding, rotational molding, casting, machining, stamping, or other suitable manufacturing processes. In some embodiments, the material(s) are selected to be light-weight and/or resistant to corrosion from exposure to the types of fluid(s) to be retained in and dispensed from the dispenser 10. The bottle 15 can have any shape desired, and in some embodiments is shaped to permit the bottle 15 to stand substantially upright on a horizontal surface. By way of example only, the illustrated bottle 15 is generally cuboid in shape, and has bulbs at each of four bottom corners. However, other shapes, materials and configurations of bottles can instead be used as desired. In other, non-illustrated embodiments, the bottle 15 is replaced with a bag-in-box arrangement, such that a bag, pouch or other flexible container contains the fluid and is at least partially contained within a box or other container that can provide structural support for the bag. Bag-in-box arrangements are well known in the art, and are therefore not described in greater detail herein.

As described above, the dispenser 10 illustrated in FIGS. 1-4 includes a handle 25 that allows the user to lift or hold the dispenser 10. The illustrated handle 25 extends generally radially outward from the pump 20, and includes an end portion that curves downward to inhibit a user's hand from sliding off the handle 25 while lifting or carrying the dispenser 10. However, in other embodiments, the handle 25 can have any other shape desired, including a hook, loop, or other curved shape, a substantially flat shape extending at any angle with respect to the pump 20, and the like. Some alternative handle embodiments are illustrated in FIGS. 23-26 and 29-32, all of which (including that shown in FIGS. 1-4) can be used with any of the fluid dispenser embodiments described and/or illustrated herein. The handle 25 can be included as an integral part of the pump 20, such as being integral with the pump body 22. Alternatively, the handle 25 can be a separate part permanently or releasably attached to the pump 20 (e.g., to the pump body 22) in any manner, such as by welding, soldering, or brazing, by adhesive or cohesive bonding material, by one or more screws, nails, pins, clasps, posts, clamps, or other fasteners, by inter-engaging elements on the handle 25 and the pump 20 (e.g., threaded connections, inter-engaging fingers, snap feature, or other mating parts), and the like. In other non-illustrated embodiments, the handle 25 is defined by or connected to the bottle 15, or is defined by or connected to both the bottle and the pump 20.

With continued reference to the illustrated embodiment of FIGS. 1-4, the spout 30 extends radially away from the pump 20, and is shaped to extend in a generally downward direction. Like the handle 25, the spout 30 can be formed integrally with the pump body 20, or can be a separate component attached thereto in any suitable manner (including any of the handle connection types described above). The spout 30 is in fluid communication with a conduit 45 that receives fluid from a pump chamber 24 (described in greater detail below). The conduit 45 can have any length and can extend in any direction suitable for performing this function. In the illustrated embodiment of FIGS. 1-4 for example, the conduit 45 extends from a bottom of the pump chamber 24 to the spout 30, whereas in other embodiments, the conduit 45 extends from any other location along the pump chamber 24 to the spout 30. In some cases, a pump conduit extending and connected to the bottom of the pump chamber 24 can provide a greater degree of control regarding the quantity of fluid dispensed upon actuation of the pump 20. The conduit 45 can be defined by one or more tubes and fittings connected to the spout 30 and to a pump cylinder 85 at least partially defining the pump chamber 24, or can be entirely or partially defined by another part of the pump 20 (e.g., a part of the pump cylinder 85).

The pump 20 in the illustrated embodiment of FIGS. 1-4 includes an aperture 50 through which the piston 35 is received. The piston 35 is movable with respect to the bottle 15 (e.g., movable into and out of the bottle 15) and is sealed with respect to the pump chamber 24 by a piston seal 55 to ensure a leak-proof relationship between the piston 35 and the pump cylinder 85 in which the piston 35 moves. Therefore, as the piston 35 is moved in an upward direction in FIGS. 1-4, the piston seal 55 generates a vacuum force within the pump cylinder 85, causing fluid from within the bottle 15 to be drawn into the pump cylinder 85 (e.g., by a tube 42 or other conduit, in some embodiments). Also, as the piston 35 is then moved in a downward direction in FIGS. 1-4, the piston seal 55 generates an increased fluid pressure within the pump cylinder 85, causing fluid to be discharged from the pump cylinder 85 through the conduit 45 and spout 30. In some embodiments, the piston 35 is biased outward (i.e., upward in FIGS. 1-4) by a spring 60 or other biasing element. In the illustrated embodiment, a coil spring 60 is provided to bias the piston 35 outward from the bottle 15. In other embodiments, opposite ends of a coil spring can be attached to the top of the pump cylinder and to the bottom of the piston 35 in order to provide a similar biasing force. In still other embodiments, a sealed and pressurized chamber can be positioned to exert a biasing force upon the piston 35 to perform the same function. Alternatively, no such spring or other biasing device is used to bias the piston 35, in which cases the piston 35 can be moved outwardly by a user.

In some embodiments, the amount of fluid dispensed by actuation of the pump (i.e., by movement of the piston 35) depends at least in part upon the amount of movement of the piston 35. For example, to dispense a larger or smaller amount of fluid from the dispensing chamber 24 in the illustrated embodiments of FIGS. 1-4, the piston 35 is moved upward and downward a larger or smaller amount, respectively. Accordingly, the amount of fluid can be controlled by limiting or otherwise controlling the amount of movement of the piston 35 with respect to the pump cylinder 85. This function can be performed by a movable connection between the piston 35 and one or more other parts of the pump 20. In some embodiments, this movable connection includes one or more protrusions (e.g., pins, posts, bumps, walls, and the like) of the piston 35 movable along one or more apertures (e.g., grooves, slots, channels, elongated recesses, and the like) on an adjacent portion of the pump 20. In some embodiments, this movable connection also or instead includes one or more apertures (e.g., grooves, slots, channels, elongated recesses, and the like) of the piston 35 in which move one or more protrusions (e.g., pins, posts, bumps, walls, and the like) of an adjacent portion of the pump 20.

For example, and with reference again to the illustrated embodiment of FIGS. 1-4, the piston 35 is provided with two axially-extending apertures 62, 63 in which travels a protrusion 61 located on an adjacent portion of the pump 20. In this embodiment, the protrusion 61 is located on a collar 26 surrounding the piston 35. The collar 26 is integrally formed with the pump body 22 or is a separate part connected thereto in any suitable manner. In other embodiments, the protrusion 61 is located on another part of the pump 20 adjacent the piston 35 (e.g., extending from a wall that does not necessarily circumscribe the piston, from another internal surface of the aperture 50, and the like). The protrusion 61 illustrated in the embodiment of FIGS. 1-4 is located on a flexible portion of the pump body 22 in order to enable easy assembly of the piston 35 into the rest of the pump 20. In particular, the collar 26 includes two apertures 28 (see FIG. 3) defining therebetween a cantilever from which the protrusion 61 extends. Alternatively, the protrusion 61 can extend from any other semi-flexible portion of the pump body 22 for this purpose.

The protrusion 61 in the embodiment of FIGS. 1-4 is positioned to engage and run within the axially-extending apertures 62, 63 of the piston 35. The first aperture 62 permits the piston 35 to move a first distance determined at least in part by the movement of the first aperture 62 with respect to the protrusion 61. The second aperture 63 permits the piston 35 to move a second distance determined at least in part by the movement of the second aperture 63 with respect to the protrusion 61. The second distance is greater than the first distance, due to the fact that the second aperture 63 is longer than the first aperture 62. Each aperture 62, 63 has at least one lower limit or stop at which the protrusion 61 prevents further withdrawal of the piston 35. In some embodiments, either or both of the apertures 62, 63 has an upper limit or stop which prevents further depression of the piston 35.

As best shown in FIG. 3, the piston 35 of the pump 20 is rotatable about its own axis 32, and can therefore be twisted by a user to different circumferential positions with respect to the rest of the pump 20 (e.g., the collar 26, the pump body 22, and the pump cylinder 85). In this manner, the positional relationship between the first and second apertures 62, 63 and the protrusion 61 can be changed to enable the protrusion 61 to be aligned or substantially aligned with a desired one of the apertures 62, 63. This alignment can take place at one or more locations along the piston 35, such as at the top of the piston 35 illustrated in FIGS. 1-4 where the two apertures 62, 63 meet.

In some embodiments, one or more of the apertures 62, 63 of the piston 35 has a portion 36 in which the piston 35 is blocked from movement in a dispensing direction (i.e., in a downward direction in the illustrated embodiment of FIGS. 1-4). The piston 35 can be rotated to a position in which the protrusion 61 is located in this locking portion 36, and therefore prevents the piston 35 from being moved to dispense fluid as described above. In these and other embodiments, this locking portion 36 is located to prevent movement of the piston 35 in a direction opposite the dispensing direction (i.e., in an upward direction in the illustrated embodiment of FIGS. 1-4). The piston 35 can therefore be rotated in such embodiments to a position in which the protrusion 61 is located in this locking position, and therefore prevents the piston 35 from being moved to draw fluid into the pump cylinder 85. This second type of locking portion 36 can be used for retaining the pump 20 in a compact state, such as during shipment or storage. Further, a converging angle can be formed between the top sections of the apertures 62, 63, thereby causing the piston 35 to naturally turn to a central angular position in the first section of pumping action such that protrusion 61 becomes aligned with the locking portion 36 after each normal operation of the pump 20. This alignment leaves the pump 20 in a storage position after use, encourages the user to consciously select which dose size is required for each dispensing operation, and prevents the pump 20 from refilling to a primed level (after a dispense) that is not desired by the user in the next dispensing operation.

A user can set the amount of fluid to be dispensed from the dispenser 10 by twisting the piston 35 to a desired rotational setting corresponding to a protrusion and aperture positional relationship in which the piston 35 will move the proper distance to dispense the amount of fluid. In some embodiments, the pump 20 includes one or more indicators to indicate which circumferential positions of the piston 35 correspond to which fluid dispense amounts (i.e., to a corresponding protrusion and aperture combination). These indicators can be non-alphanumeric (e.g., symbols or graphics) and/or alphanumeric, and in some embodiments are located on the user-manipulatable control 40 of the piston 35 and/or on the collar 26, spout 30, or pump body 22 adjacent the piston 35. For example, the user-manipulatable control 40 illustrated in FIGS. 1-4 defines a knob having indicia 34 thereon. In some embodiments, the indicia 34 are representative of the type of container, receptacle, surface, or other location at which fluid is to be dispensed, and can therefore be representative of the quantity of fluid recommended or typically used for such applications and/or of the relative sizes of fluid dispense for each rotational position of the piston 35. For example, the piston 35 illustrated in FIGS. 1-4 has three indicia: a first indicator in the form of a spray bottle corresponding to the first aperture 62 of the piston 35, a second indicator in the form of a bucket corresponding to the second aperture 63 of the piston 35, and a third indicator in the form of a padlock corresponding to the locking portion 36 between the first and second apertures 62, 63.

The piston 35 illustrated in FIGS. 1-4 is rotated in a clockwise direction to align the protrusion 61 with the first aperture 62. The piston 35 is rotated in the direction of counter-clockwise arrow A2 to align the protrusion 61 with the second aperture 63, as shown in FIG. 3.

Since the rotational positions of the piston 35 for different types (i.e., amounts) of fluid dispense are determined at least in part by the locations of the apertures 62, 63 of the piston 35, the circumferential locations of the indicia 34 will also be determined at least in part by the locations of the apertures 62, 63.

The pump 20 illustrated in FIGS. 1-4 is adapted to dispense two different predetermined quantities of fluid based upon two different rotational positions of the piston 35 (and therefore, based upon the positional relationship of the protrusion 61 with respect to two different piston apertures 62, 63). However, the piston 35 can have any number of different apertures 62, 63 of any number of different lengths corresponding to different predetermined quantities of fluid dispensed upon actuation of the piston 35. Such apertures 62, 63 can be arranged in any rotational positions desired, and can have any relative lengths for different predetermined quantities of fluid dispensed.

In some embodiments, the apertures 62, 63 of the piston 35 are integrally formed with the piston 35, such as by being molded into, cast with, or machined into the piston 35. However, in other embodiments, the apertures 62, 63 are defined in a separate component 64 of the piston 35 that can be permanently or releasably attached to the piston 35. In such a manner, two or more different types of pistons 35 can be provided by simply selecting and attaching the desired component 64, thereby providing pistons 35 with different numbers of apertures, different aperture lengths, and/or different aperture positions corresponding to different dispensing quantities and rotational positions of the piston 35. The ability to change the piston 35 and resulting dispensing characteristics by selecting or replacing the piston component 64 defining the apertures 62, 63 can significantly increase the adaptability of the fluid dispenser 10 to different fluids and applications. It should be noted that in such embodiments, the part(s) of the pump 20 carrying the indicia 34 (e.g., the user-manipulatable control 40 or other portion of the piston 35, the collar 26, and the like) can be selected or replaced to correspond to the component 64 selected or replaced.

One example of such a separate piston component 64 is a plate as shown in FIGS. 3 and 4. As indicated above, in some embodiments, a number of different plates can be interchangeable on the piston 35 to allow a user to select different combinations of fluid quantities to be dispensed for specific chemicals and applications.

The pump 20 illustrated in FIGS. 1-4 has one protrusion 61 for riding with the apertures 62, 63 as described above. However, it should be noted that the piston 35 can have any number of additional protrusions 61 movable into any other number of apertures 62, 63, in which case two or more protrusions 61 can cooperate to define the amount of permitted movement of the piston 35 in a manner similar to that described above.

It should also be noted that in some embodiments, only a single aperture 62, 63 is provided to result in a fluid dispenser capable of dispensing only a single shot size in a full stroke of the piston 35.

With continued reference to the illustrated embodiment of FIGS. 1-4, the pump 20 has two one-way valves 37, 38. Each valve 37, 38 is a ball valve, although a mitril valve, duck bill valve, umbrella valve, or any other type of one-way valve can instead be used as desired. The first valve 37 prevents backflow of fluid from the fluid chamber 24 back into the bottle 15 (e.g., when the pump 20 is actuated to dispense fluid from the fluid chamber 24), and can be connected to or seated upon a valve plate at least partially defining an end of the pump cylinder 85. The second valve 38 prevents air from being drawn into the fluid chamber 24 (e.g., when the pump 20 is actuated to draw fluid into the fluid chamber 24 from the bottle 15), and can be connected to or seated upon the valve plate described above or can be located in the conduit 45 or spout 30, if desired.

FIGS. 5-8A illustrate another embodiment of a fluid dispenser 110 according to the present invention. This embodiment employs much of the same structure and has many of the same properties as the embodiments of the fluid dispenser 10 described above in connection with FIGS. 1-4. Accordingly, the following description focuses primarily upon structure and features that are different than the embodiments described above in connection with FIGS. 1-4. Reference should be made to the description above in connection with FIGS. 1-4 for additional information regarding the structure and features, and possible alternatives to the structure and features of the fluid dispenser 110 illustrated in FIGS. 5-8A and described below. Features and elements in the embodiment of FIGS. 5-8A corresponding to features and elements in the embodiments described above in connection with of FIGS. 1-4 are numbered in the 100 series of reference numbers.

As described above in connection with the embodiment of FIGS. 1-4, in some embodiments, the movable connection between the piston 135 and an adjacent portion of the pump 120 includes one or more protrusions (e.g., pins, posts, bumps, walls, and the like) of the piston 135 movable along one or more apertures (e.g., grooves, slots, channels, elongated recesses, and the like) on an adjacent portion of the pump 120. An example of this protrusion and aperture arrangement is illustrated in FIGS. 5-8A. In such embodiments, one or more protrusions 165 of the piston 135 extend radially outward from the piston 135, and are movable within apertures 175, 180 in an adjacent portion of the pump 120 as will be described in greater detail below. For example, the piston 135 illustrated in FIGS. 5-8A carries two protrusions 165 on opposite sides of the piston 135 proximate the bottom of the piston 135. The protrusions 165 can be integrally formed with the piston 135, can instead be separate elements connected to the piston 135 in any suitable manner, including the manners of handle connection described above in connection with the embodiment of FIGS. 1-4. In those cases where the protrusions 165 are separate elements connected to the piston 135, the protrusions 165 can be individually connected to the piston 135 or can be carried by a separate element (e.g., ring, collar, or other element) that is itself connected to the piston 135.

Figures 12A, 13A:
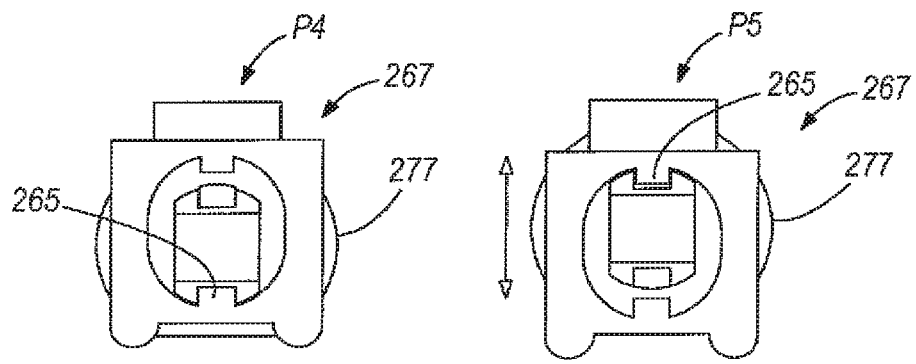
FIGS. 12A and 13A are cross-section views of the portion of the fluid dispenser shown in FIGS. 12 and 13.
Figures 12, 13:
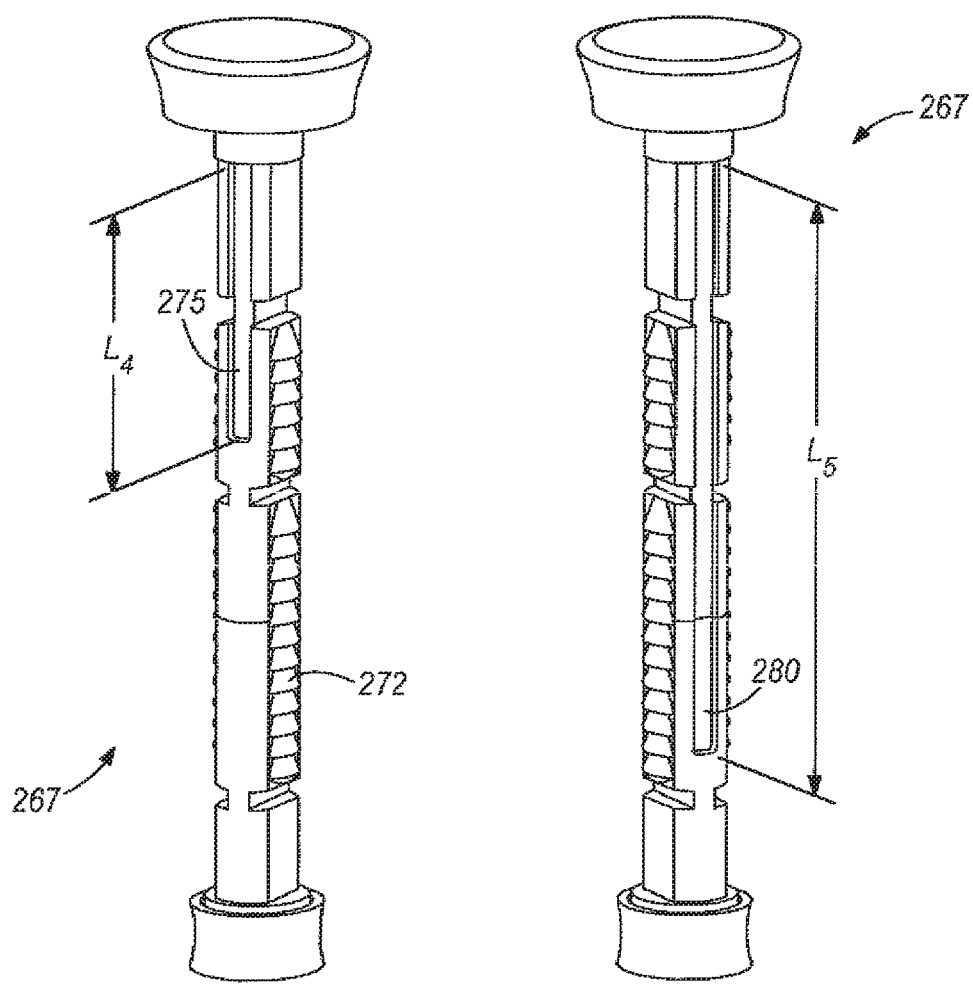
FIGS. 12 and 13 are perspective views of a portion of the fluid dispenser shown in FIGS. 9-11.

In some embodiments, the positions of one or more protrusions 165 can be selected as desired from two or more possible positions along or about the piston 135, thereby enabling an assembler or user to adapt the piston 135 to different amounts and types of piston movement. In yet other embodiments, as best illustrated in FIGS. 12A and 13A, the protrusions 165 can be positioned on a separate component that is positioned around the piston 135.

Figure 6:
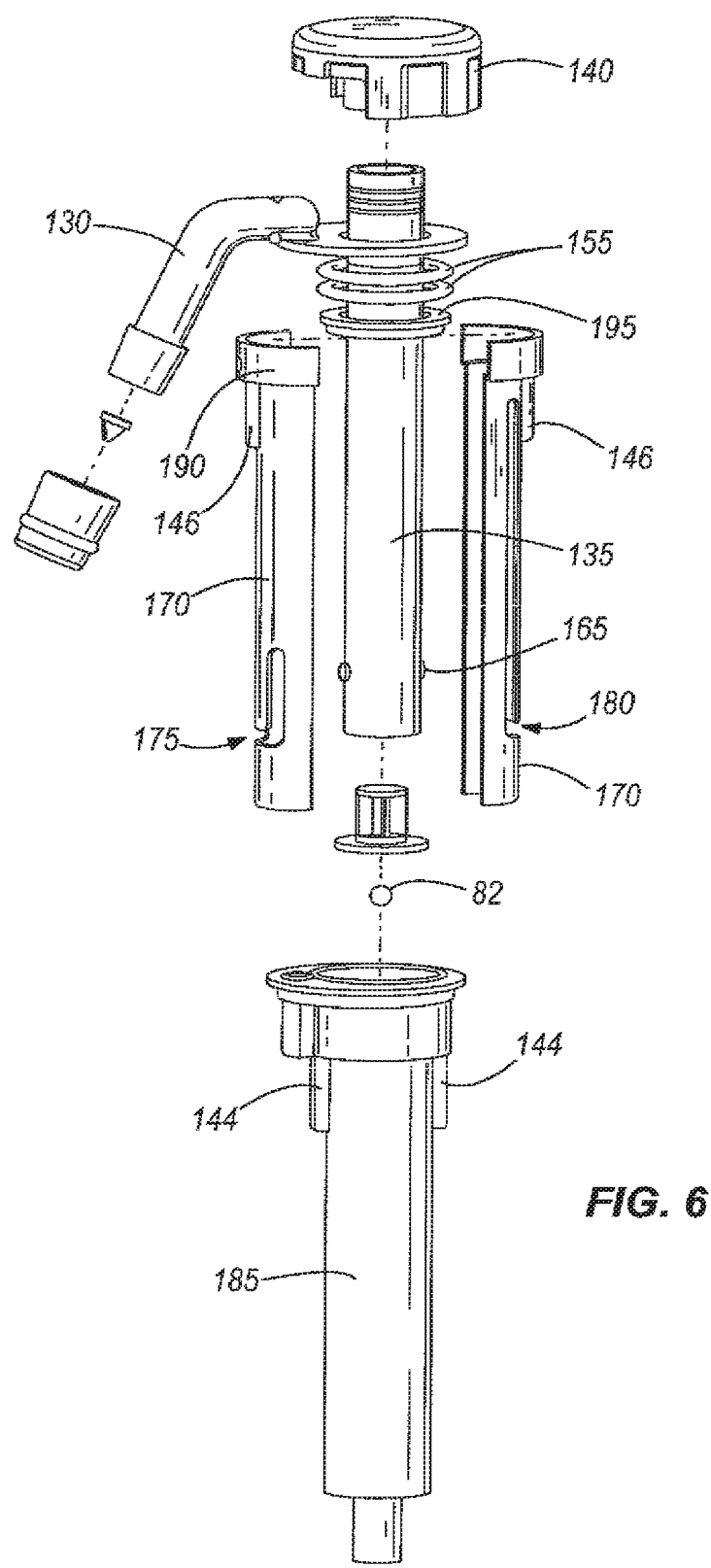
FIG. 6 is an exploded view of the fluid dispenser shown in FIG. 5.

With reference now to FIG. 6, the illustrated pump 120 has an insert 170 in which are defined the apertures 175, 180 for receiving the protrusions 165. The insert 170 can be made from any of the materials and in any of the manners described above in connection with the pump and bottle materials and manufacturing manners. The insert 170 can be defined by any number of pieces (i.e., a single piece or any number of additional pieces), and in the illustrated embodiment is defined by two pieces. The insert 170 can have any size and shape suitable for at least partially defining the apertures 175, 180, and in the illustrated embodiment is a two-piece sleeve in which two halves of the insert 170 substantially surround the piston 135. The two pieces can be separate or joined together in any suitable manner, including any of the manners of handle attachment described above in connection with the embodiment of FIGS. 1-4.

In some embodiments, the insert 170 is secured from rotating freely within the pump cylinder 185. This can be accomplished by connecting the insert 170 to the pump cylinder 185 in any of the manners described above regarding handle attachment in connection with the embodiment of FIGS. 1-4. However, in some embodiments, it is desirable to remove and replace the insert 170. Therefore, a connection manner permitting such removal and replacement can be used in such embodiments. For example, the insert 170 and piston cylinder 185 can have a keyed or other mating engagement to prevent relative rotation while still permitting insert removal and replacement. The keyed or other mating engagement allows flexibility and stock efficiency in assembling different versions or sizes of inserts 170 and piston cylinders 185. In the illustrated embodiment, protrusions 144 of the insert 170 are received within apertures 146 of the pump cylinder 185, although the locations of these protrusions 144 and apertures 146 can be reversed, and the shapes and sizes of these protrusions 144 and apertures 146 can be changed while still performing the same function.

Each half of the illustrated insert 170 includes a respective one of the apertures 175, 180 extending axially alongside the piston 135. The slot-like apertures 175, 180 receive the protrusions 165 as described above in order to guide the piston 135 along the insert 170. In a manner similar to the relationship between the protrusion 65 and apertures 62, 63 in the illustrated embodiment of FIGS. 1-4, the apertures 175, 180 limit travel of the piston 135 within the piston chamber 124, thereby defining the amount of fluid dispensed by the pump 120 upon actuation. The apertures 175, 180 can be different lengths, such that a user can move the piston 135 at least two different lengths along the insert 170 based upon the rotational position of the piston 135. In some embodiments, the different lengths correspond to the different quantities of fluid drawn into and discharged from the piston chamber 124 when the piston 135 is actuated.

The pump cylinder 185 can be connected to a bottle (not shown in FIGS. 5-8A) in any of the manners described above in connection with the illustrated embodiment of FIGS. 1-4. In the illustrated embodiment of FIGS. 5-8A, the pump cylinder 185 has a lip 190 near a top portion of the pump cylinder 185 for receiving the piston seal 155 and in some embodiments, a seal seat 195 of the insert 170. In this arrangement, the piston 135 can move within the pump cylinder 185 to draw fluid therein and to discharge fluid therefrom while retaining a fluid-tight seal between the stationary piston seal 155 and the moving piston 135.

By twisting the piston 135 to different rotational positions within the insert 170 and pump cylinder 185, the protrusions 165 carried by the piston 135 can move within a lower circumferentially-extending portion of each aperture 175, 180 until the protrusions 165 are aligned or substantially aligned with one of two axially-extending legs of each aperture 175, 180 (the apertures 175, 180 being substantially U-shaped with the legs of each U having different axially extending lengths). The piston 135 can then be pulled by a user and/or moved by a spring or other biasing element (as described above) to draw fluid within the pump cylinder 185 until the protrusions 165 reach the top limit(s) or stop(s) of their aperture legs in which the protrusions 165 move. Thereafter, the piston 135 can be depressed to move the protrusions 165 back down their respective aperture legs to increase the fluid pressure within the pump chamber 124. In this manner, fluid is discharged from the pump chamber 124 through a conduit connected to the pump cylinder 185 at a higher elevation than the conduit 45 described above in connection with FIGS. 1-4. It will be appreciated that the conduit-to-pump cylinder connection location can be anywhere along the pump cylinder 185 as desired. As a result, fluid is dispensed through the spout 130 connected to the conduit.

By virtue of its shape and location, the lower circumferentially-extending portion of the apertures 175, 180 in the illustrated embodiment of FIGS. 5-8A prevents the piston 135 from being raised with respect to the pump cylinder 185, thereby defining a locked portion of the apertures 175, 180 and a locked state of the piston 135. It will be appreciated that one or more circumferentially-extending portions of the aperture(s) 175, 180 can be located at any other location along the length of the apertures 175, 180 to define different locked positions of the piston 135 relative to the pump cylinder 185. In any of these locking positions of the apertures 175, 180, the apertures 175, 180 can include one or more recesses or can otherwise be shaped to maintain the protrusions 165 in place within such positions.

Figure 7:
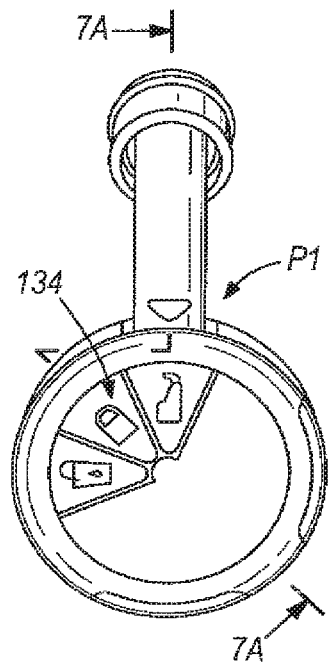
FIG. 7 is a top view of the fluid dispenser of FIGS. 5 and 6 in a first position.
Figure 8:
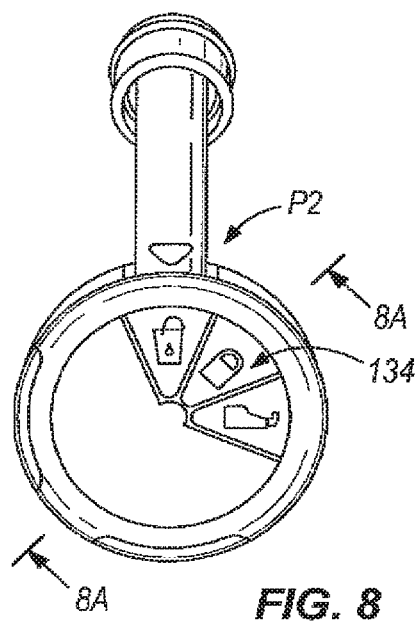
FIG. 8 is a top view of the fluid dispenser of FIGS. 5 and 6 in a second position.

The piston 135 in the illustrated embodiment of FIGS. 5-8A includes a user-manipulatable control 140 that can be integral with the piston 135 or connected thereto in any suitable manner. The user-manipulatable control 140 provides a location at which a user can grasp and twist the piston 135 as described above, thereby selecting the different dispensing amounts of the pump 120. Also, the user-manipulatable control 140 provides a location for indicia 134, as described above in connection with the embodiment of FIGS. 1-4. The embodiment of FIGS. 5-8A also provide an example of how fluid dispense indicia 134 can be located elsewhere on the pump 120 (e.g., on the user-manipulatable control 140, as best shown in FIGS. 7 and 8).

Like the illustrated embodiment of FIGS. 1-4, the piston 135 can have two or more different rotational positions corresponding to the dispensing of at least two different quantities of fluid desired, and in some embodiments also including a locked position. In the illustrated embodiment, a first rotational position of the piston 135 is for refilling a spray bottle, a second rotational position is for refilling a bucket or sink, and a third rotational position is for locking the piston 135 into a fully depressed axial position.

Figure 8A:
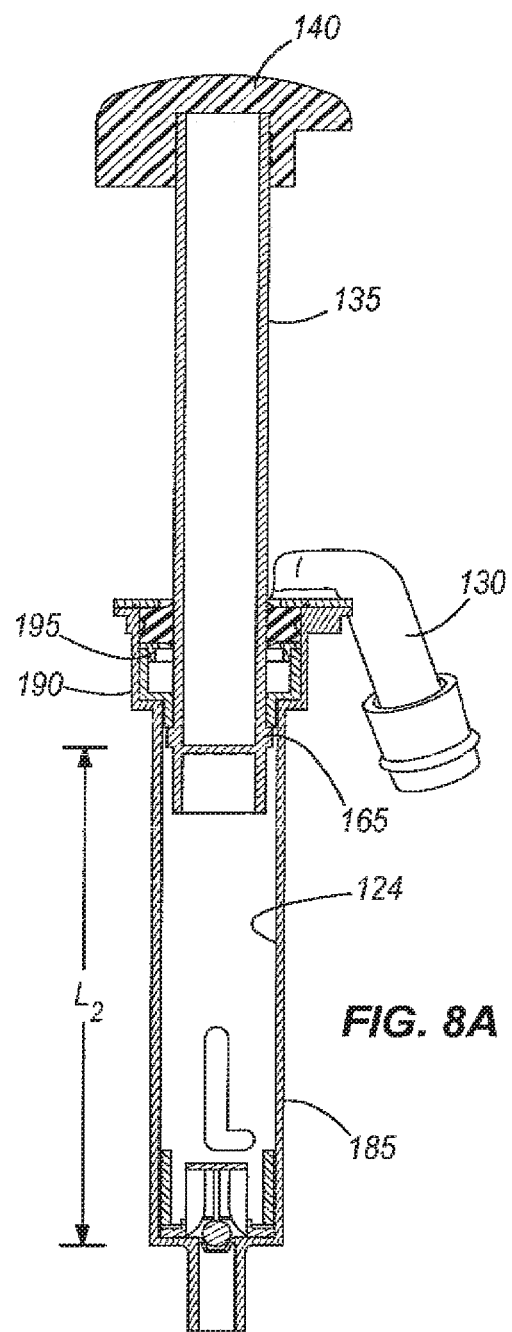
FIG. 8A is a cross-sectional view of the fluid dispenser of FIGS. 5-8, shown along line 8A-8A of FIG. 8.
Figure 9:
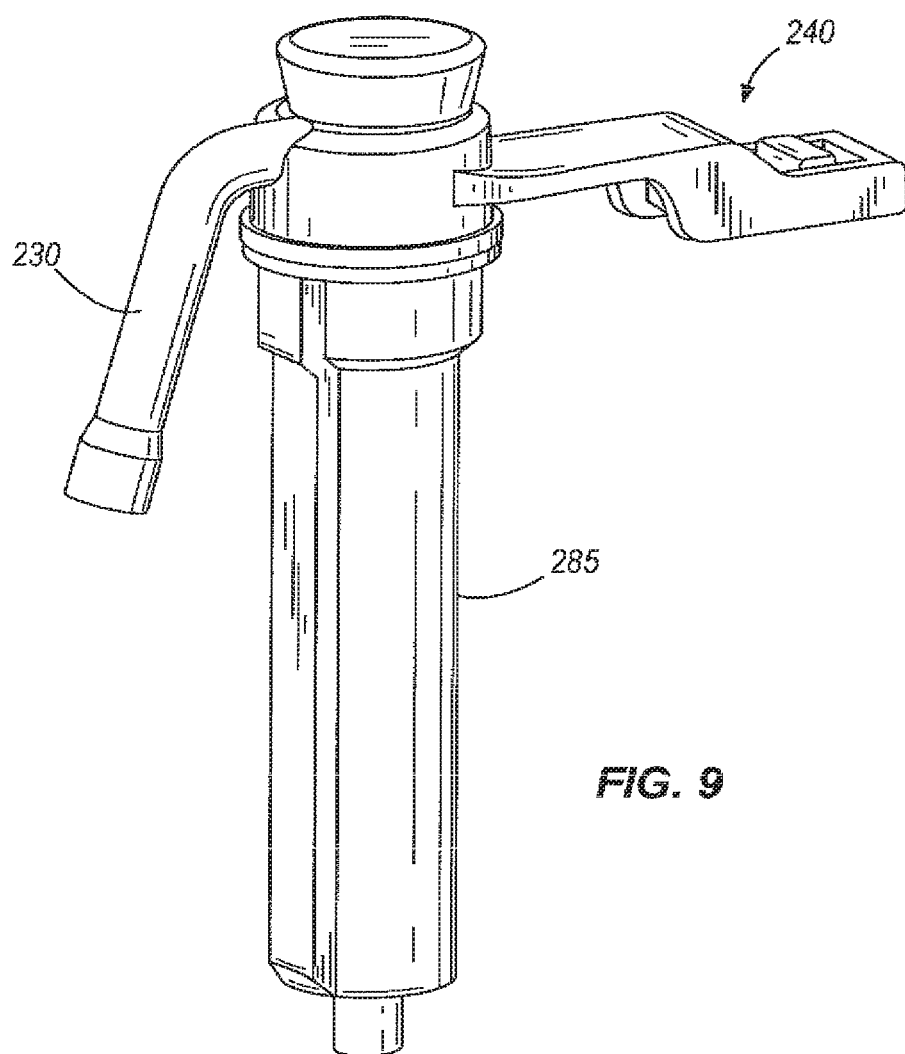
FIG. 9 is a perspective view of a fluid dispenser according to another embodiment of the present invention, shown disconnected from a bottle.
Figure 10:
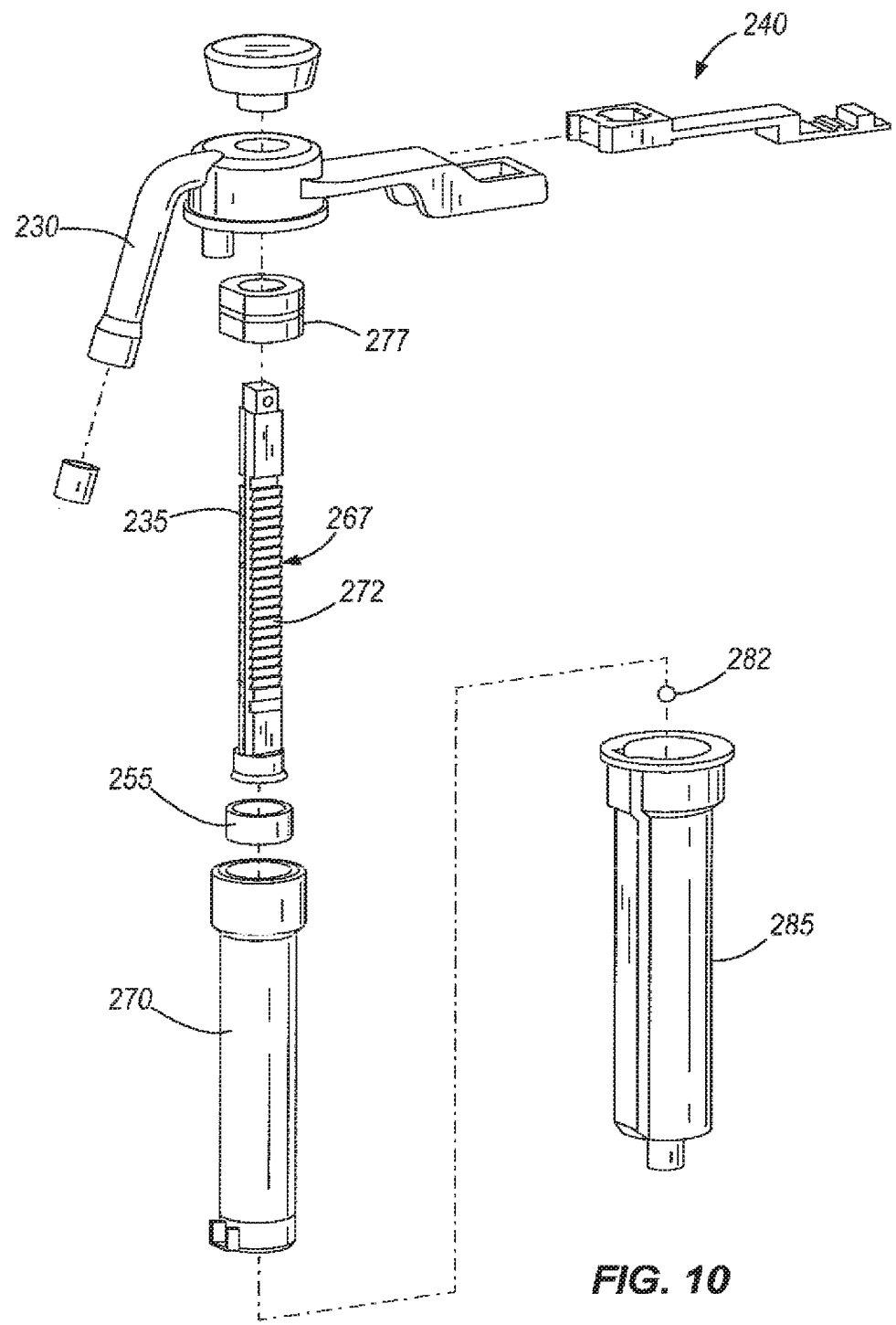
FIG. 10 is an exploded view of the fluid dispenser shown in FIG. 9.

More specifically, and with reference to FIGS. 7-8A, the first rotational position P1 of the piston 135 can correspond with a first shorter leg of each U-shaped aperture 175, 180, while the second position P2 of the piston 135 can correspond with a longer second leg of each U-shaped aperture 175, 180. When the piston 135 has been rotated to permit the protrusions 165 to move within the first leg of each aperture 175, 180, a smaller amount L1 of piston travel is permitted than when the piston 135 has been rotated to permit the protrusion 165 to move a greater amount L2 within the longer second legs of each aperture 175, 180.

Figure 7A:
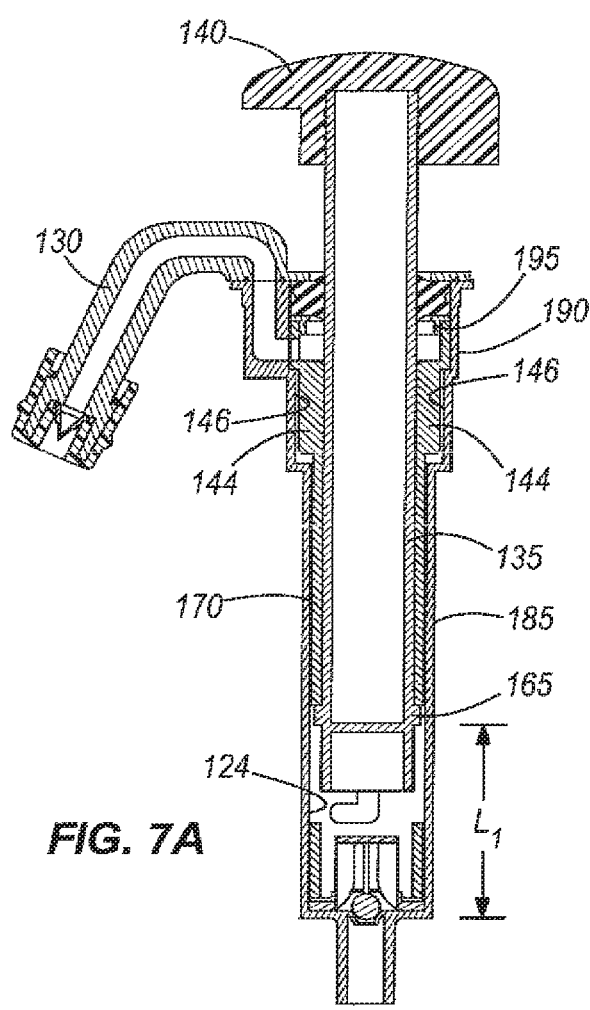
FIG. 7A is a cross-sectional view of the fluid dispenser of FIGS. 5-7, shown along line 7A-7A of FIG. 7.

FIGS. 7 and 7A illustrate the piston 135 in the first rotational position P1 and moved upward in the insert 170 and pump cylinder 185 by the first length L1. A first quantity of fluid fills the volume of the pump chamber 124 previously occupied by the piston 135. FIGS. 8 and 8A show the piston 135 in the second rotational position P2 and moved upward in the insert 170 and pump cylinder 185 by the second length L2. As shown in FIGS. 7A and 8A, L2 is greater than L1. A second quantity of fluid fills the volume of the pump chamber 124 previously occupied by the piston 135. The first and second lengths L1, L2 can be determined during the manufacturing process or by a user (e.g., by removing and replacing the insert 170 as described below). The piston 135 can also be rotated to a third position (corresponding to the lock-shaped indicia on the user-manipulatable control 140) in which the piston 135 is fixed in axial position with respect to the insert 170 and the pump cylinder 185.

As described above, in some embodiments, the insert 170 can be removed and replaced. This capability enables a user or a manufacturer to install an insert 170 having a different number of apertures 175, 180, a different arrangement of apertures 175, 180, and different types of apertures 175, 180 (e.g., apertures having different lengths, shapes, and the like) for adapting the same pump to dispense different predetermined amounts of fluids and/or different combinations of such predetermined fluid amounts. Although this capability adds significant adaptability to the dispenser 110, in some embodiments the apertures 175, 180 are instead defined within the pump cylinder 185.

FIGS. 9-17B illustrate another embodiment of a fluid dispenser 210 according to the present invention. This embodiment employs much of the same structure and has many of the same properties as the embodiments of the fluid dispensers 10, 110 described above in connection with FIGS. 1-8A. Accordingly, the following description focuses primarily upon structure and features that are different than the embodiments described above in connection with FIGS. 1-8A. Reference should be made to the description above in connection with FIGS. 1-8A for additional information regarding the structure and features, and possible alternatives to the structure and features of the dispenser 210 illustrated in FIGS. 9-17B and described below. Features and elements in the embodiment of FIGS. 9-17B corresponding to features and elements in the embodiments described above in connection with of FIGS. 1-8A are numbered in the 200 series of reference numbers.

In some embodiments, the quantity of fluid dispensed by the pump 220 can be changed without requiring rotation of the piston 235. In this regard, this change can be made by moving an element of the pump 220 with respect to the piston 235, thereby changing the manner in which the piston 235 moves and/or the range of motion of the piston 235. By way of example only, the pump 220 illustrated in FIGS. 9-17B includes a user-manipulatable control 240 that can be moved by a user to change the manner in which the control 240 is engaged with the piston 235. More specifically, the control 240 includes two protrusions 265 that are movable into and out of apertures 275, 280 in the piston 235. In a first position P4 of the control 240, a first protrusion 265 is received within a first aperture 275 while a second protrusion 265 is disengaged from a second aperture 280. In a second position P5 of the control 240 is disposed radially from the first position P4 (e.g., by sliding the control or manipulating the control of FIGS. 9-11 in any other manner), the first protrusion 265 is disengaged from the first aperture 275, while the second protrusion 265 is engaged within the second aperture 280. The apertures 275, 280 can take any of the forms and shapes, and can be positioned in any of the manners as described above in connection with the apertures 62, 63 in the illustrated embodiment of FIGS. 1-4, or apertures 162, 163 in the embodiment of FIGS. 5-8A.

Accordingly, when the control 240 is in the first position P4, the piston 235 is movable a first length L4, whereas when the control 240 is in the second position P5, the piston 235 is movable a longer second length L5. Indicia 234 can be provided on or adjacent the control 240 to enable a user to identify the position of the control 240 and the corresponding operational state of the pump 220.

In some embodiments, it is desirable to prevent partial actuation of the pump 220, such as partial withdrawal of the piston 235 and/or partial depression of the piston 235 followed by reversal of piston movement. The pump 220 illustrated in FIGS. 9-17B and the alternative pump components illustrated in FIGS. 17-17B (described below) provide examples of pump features preventing or inhibiting such partial actuation.

The pump 220 illustrated in FIGS. 9-17B includes a piston 235 having a ratchet mechanism 267. The illustrated ratchet mechanism 267 includes a number of radially outwardly extending teeth 272 on the piston 235. In some embodiments, there are one or more locations along the length of the piston 235 where the piston 235 has a reduced diameter and no teeth. These portions can correspond with the different positions of the user-manipulatable control 240 described above. The ratchet mechanism 267 can also include a pawl 277 having one or more shims 278 extending radially inward to engage the teeth 272 of the piston 235 as the piston 235 is moved past the pawl 277. In some embodiments, the pawl 277 is secured in place with respect to the piston 235 and the rest of the pump 220. Also in some embodiments, the pawl 277 is an annular element with one or more shims 278 positioned for such engagement, although any other element having one or more shims positioned for such engagement is possible, and falls within the spirit and scope of the present invention. The shims 278 are operable to engage the teeth 272, such that the shims 278 deflect in response to contact with the teeth 2725. The shims 278 can be made from a flexible and resilient polymer or other flexible and resilient material, and are dimensioned to be received in an undeflected or substantially undeflected state within the toothless portions of the piston 235 when aligned with such portions.

Figure 16A:
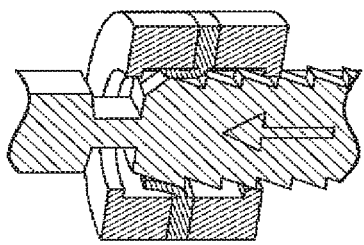
FIGS. 16-16F are cross-sectional views of part of the fluid dispenser illustrated in FIGS. 9-15B, shown in various positions.
Figure 16C:
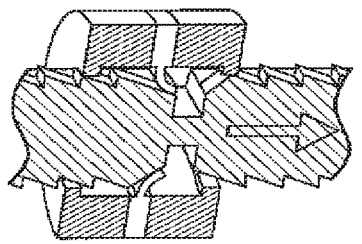
Figure 16B:
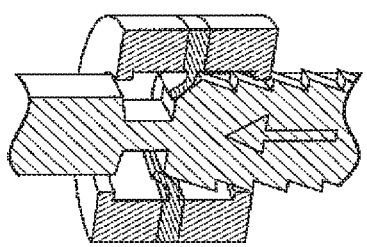
Figure 16F:
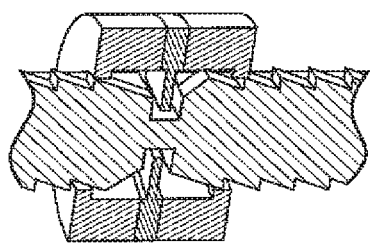
Figure 16E:
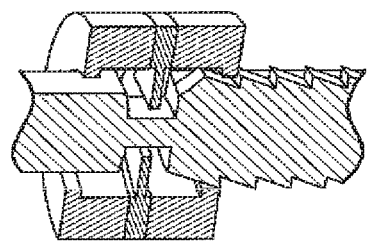
Figure 16D:
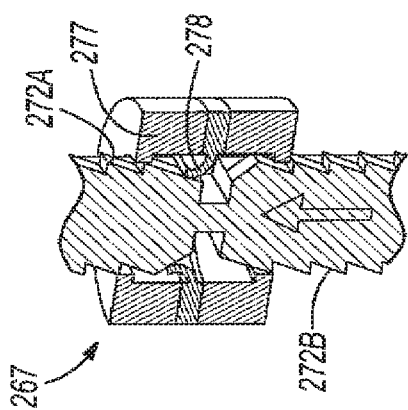
Figure 16:
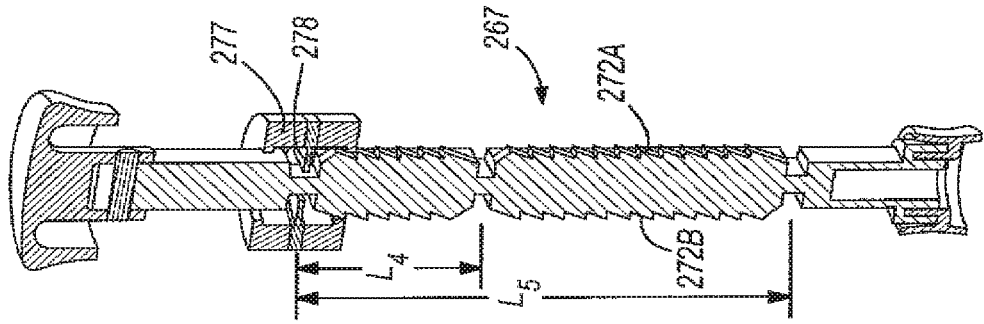
Figure 17:
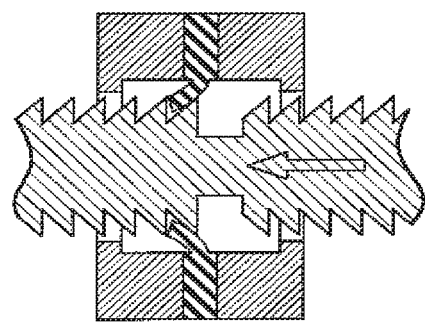
FIGS. 17-17B are cross-sectional detail views of another fluid dispenser according to the present invention.
Figure 17A:
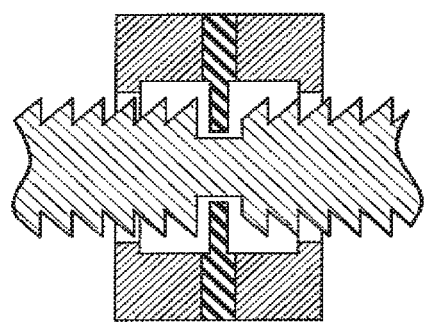
Figure 17B:
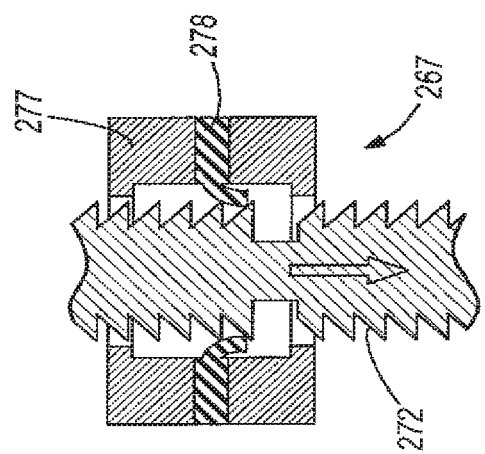

FIGS. 16-16F and 17-17B illustrate various phases of moving the toothed piston 235 past the pawl 277. The teeth 272 carried by the piston 235 (see FIGS. 16-16F) face in opposite directions, such that the teeth 272A on one side of the piston 235 are angled upward, while the teeth 272B on another side of the piston 235 are angled downward. The teeth 272 of FIGS. 17-17B are all angled downward. The embodiments of FIGS. 16-16F and 17-17B are given by way of example only. It will be appreciated that other arrangements and configurations of teeth 272 are possible, and are considered to be within the spirit and scope of the present invention.

When the piston 235 has moved to axial locations at which the shims 278 of the pawl 277 are aligned or substantially aligned with the toothless reduced-diameter portions of the piston 235, the shims 278 return to an unflexed or substantially unflexed state as shown in FIGS. 16, 16A, 16E and 17A. However, as the piston 235 (and ratchet mechanism 267) is pulled past the toothless reduced-diameter portions, the shims 278 are deflected by contact with the teeth 272, as shown in 16B-16D and 17. The piston 235 (and ratchet mechanism 267) can continue to be pulled until the shims 278 are released from deflection from the teeth 272 and are allowed to extend into another toothless reduced-diameter portion of the piston 235. Therefore, if a user pushes the ratchet mechanism 267 back into the cylinders 270, 285 before the shims 278 are released from deflection (i.e., before the piston 235 has been moved sufficiently to a position corresponding to alignment of the shims 278 with another toothless reduced-diameter portion of the piston 235), the shims 278 will be held in place by the teeth 272A, 272B and will resist such movement. Therefore, the teeth 272 inhibit partial quantities of fluid from being dispensed from the fluid dispenser 210. However, after the shims 278 are released from deflection in one of the toothless reduced-diameter portions of the piston 235, the direction of movement of the ratchet mechanism 267 can be reversed, thus deflecting the shims 278 against the teeth 272 in an opposite direction as shown in FIGS. 16F and 17B.

By virtue of the oppositely-directed teeth 272A, 272B carried by the piston 235 shown in FIGS. 16-16F, the above-described piston-limiting movement occurs in both directions of piston movement (i.e., fluid draw and fluid discharge). However, it will be appreciated that teeth can be selected to point in only one direction to limit such piston movement in only one direction of piston movement (i.e., fluid draw or fluid discharge). An example of such an embodiment is illustrated in FIGS. 17-17B.

In each of the embodiments illustrated in FIGS. 1-17B, the piston 235 of the illustrated pump 20, 120, 220 is actuated while the pump cylinder 85, 185, 285 remains stationary with respect to the bottle 15, 115, 215. This relationship between the piston 35, 135, 235, pump cylinder 85, 185, 285, and bottle 15, 115, 215 can present significant advantages due to the fact that the fluid dispenser 10, 110, 210 can be positioned on a shelf, floor, or other surface and can remain stationary while the piston 35, 135, 235 is actuated and that the dispenser 10, 110, 210 can also remain stationary relative to the spray bottle, bucket, sink or other receptacle being dosed, thereby enabling greater ergonomics, safety and fluid dispensing accuracy.

Figure 18:
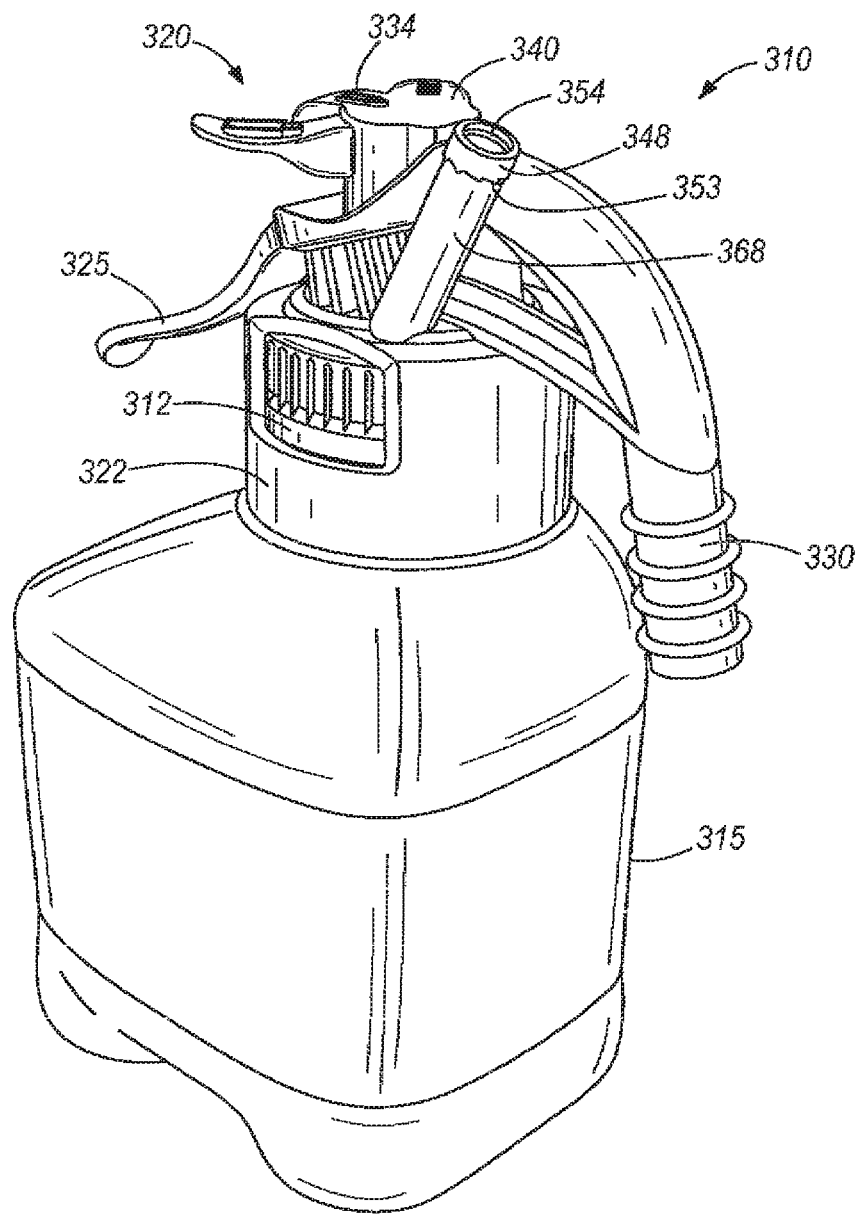
FIG. 18 is a perspective view of a fluid dispenser with a refill port according to an embodiment of the present invention.
Figure 19:
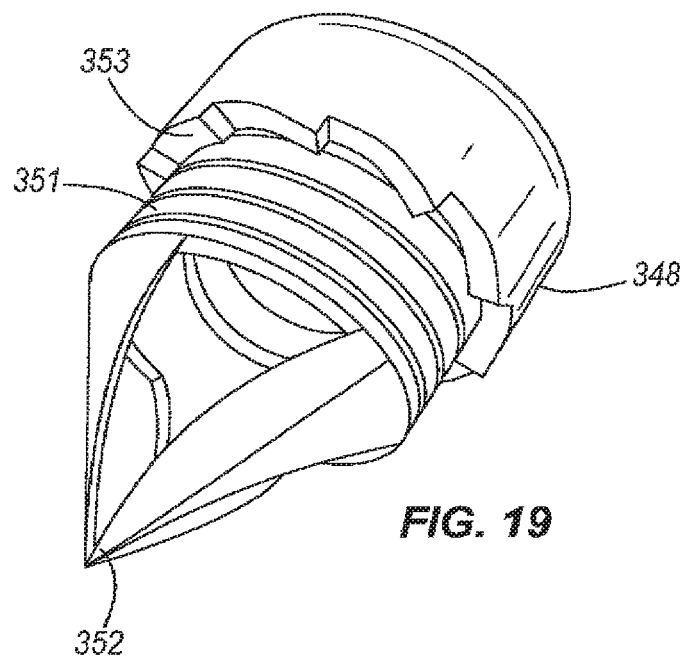
FIGS. 19 and 20 are perspective views of the refill port shown in FIG. 18.
Figure 20:
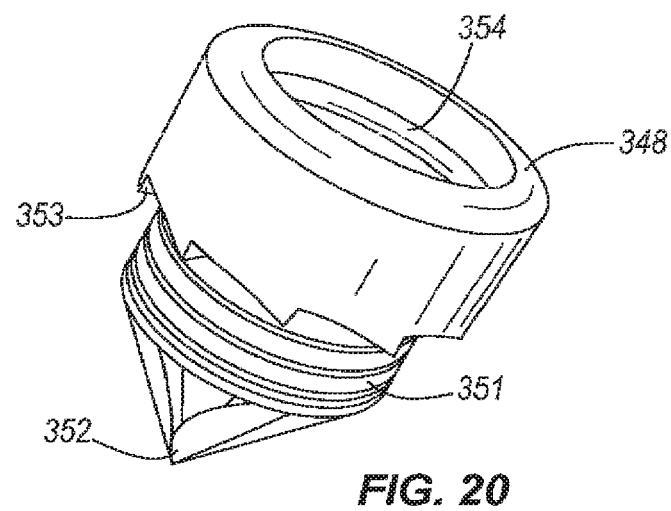

FIGS. 18-20 illustrate another embodiment of a fluid dispenser 310 according to the present invention. This embodiment employs much of the same structure and has many of the same properties as the embodiments of the fluid dispensers 10, 110, 210 described above in connection with FIGS. 1-17B. Accordingly, the following description focuses primarily upon structure and features that are different than the embodiments described above in connection with FIGS. 1-17B. Reference should be made to the description above in connection with FIGS. 1-17B for additional information regarding the structure and features, and possible alternatives to the structure and features of the fluid dispenser 310 illustrated in FIGS. 18-20 and described below. Features and elements in the embodiment of FIGS. 18-20 corresponding to features and elements in the embodiments described above in connection with of FIGS. 1-17B are numbered in the 300 series of reference numbers.

The fluid dispenser 310 illustrated in FIGS. 18-20 includes a pump 320, a spout 330, a cap 312 coupled to a pump body 322 and a bottle 315, and a handle 325 coupled to the pump 320 and the spout 330. The fluid dispenser 310 can also include a user-manipulatable control 340 including indicia 334 indicating a dose size or a position of a piston (not visible in FIGS. 18-20). In some embodiments, a puncture lock refill port can be used to allow a user to refill the fluid dispenser 310 any number of times. A puncture lock refill port according to an embodiment of the present invention is illustrated in FIGS. 18-20, and is indicated generally at 348.

The puncture lock refill port 348 in the illustrated embodiment of FIGS. 18-20 is located on a hollow shaft 368 of the pump 320. FIG. 18 shows the puncture lock refill port 348 installed on the fluid dispenser 310 by inserting the puncture lock refill port 348 on the protruding shaft 368. In other embodiments, the puncture lock refill port 348 can be coupled to any portion of the fluid dispenser 310, such as on the cap 312, on the pump body 322, or on the bottle 315. The puncture lock refill port 348 can be utilized with any of the other fluid dispenser embodiments described and/or illustrated herein. Installation of the puncture lock refill port 348 on the fluid dispenser 310 can occur during manufacturing of the fluid dispenser 310, after the fluid dispenser 310 is manufactured but prior to commercial sale and/or use of the fluid dispenser 310, or during commercial use of the fluid dispenser 310.

The puncture lock refill port 348 illustrated in FIGS. 19 and 20 includes a sharp point 352 operable to puncture through a portion of the fluid dispenser 310, such as a seal located on the bottle 315 or on the pump body 322. The illustrated puncture lock refill port 348 includes threads 351 that can be self-tapping into the fluid dispenser 310 to secure the puncture lock refill port 348 to the fluid dispenser 310 and to drive the puncture action. However, in other embodiments, such threads are not used, in which cases the puncture lock refill port 348 can be retained in a secured position on the fluid dispenser 310 by crimping, snapping into a toothed feature, or in any other suitable manner.

The puncture lock refill port 348 illustrated in FIGS. 19 and 20 further includes a plurality of teeth 353 operable to engage the fluid dispenser 310 to prevent removal of the puncture lock refill port 348 from the fluid dispenser 310 once installed. The illustrated puncture lock refill port 348 further includes a seal, such as an o-ring seal 354 to sealingly engage a tube or conduit inserted into the puncture lock refill port 348 to refill the fluid dispenser 310. The puncture lock refill port 348 can also have an internal valve (e.g., ball valve, internal biased flap, and the like) operable to inhibit fluid flow back out of the fluid dispenser 310 when no conduit or tube is inserted into the port 348, while still allowing fluid flow therethrough when a tube or conduit is inserted into the port 348. In some embodiments, the puncture lock refill port 48 is operable to inhibit leakage, even if the fluid dispenser 310 is tipped over.

FIGS. 21-28 illustrate another embodiment of a fluid dispenser 410 according to the present invention. This embodiment employs much of the same structure and has many of the same properties as the embodiments of the fluid dispensers 10, 110, 210, 310 described above in connection with FIGS. 1-20. Accordingly, the following description focuses primarily upon structure and features that are different than the embodiments described above in connection with FIGS. 1-20. Reference should be made to the description above in connection with FIGS. 1-20 for additional information regarding the structure and features, and possible alternatives to the structure and features of the fluid dispenser 410 illustrated in FIGS. 21-28 and described below. Features and elements in the embodiment of FIGS. 21-28 corresponding to features and elements in the embodiments described above in connection with of FIGS. 1-20 are numbered in the 400 series of reference numbers.

Figure 21:
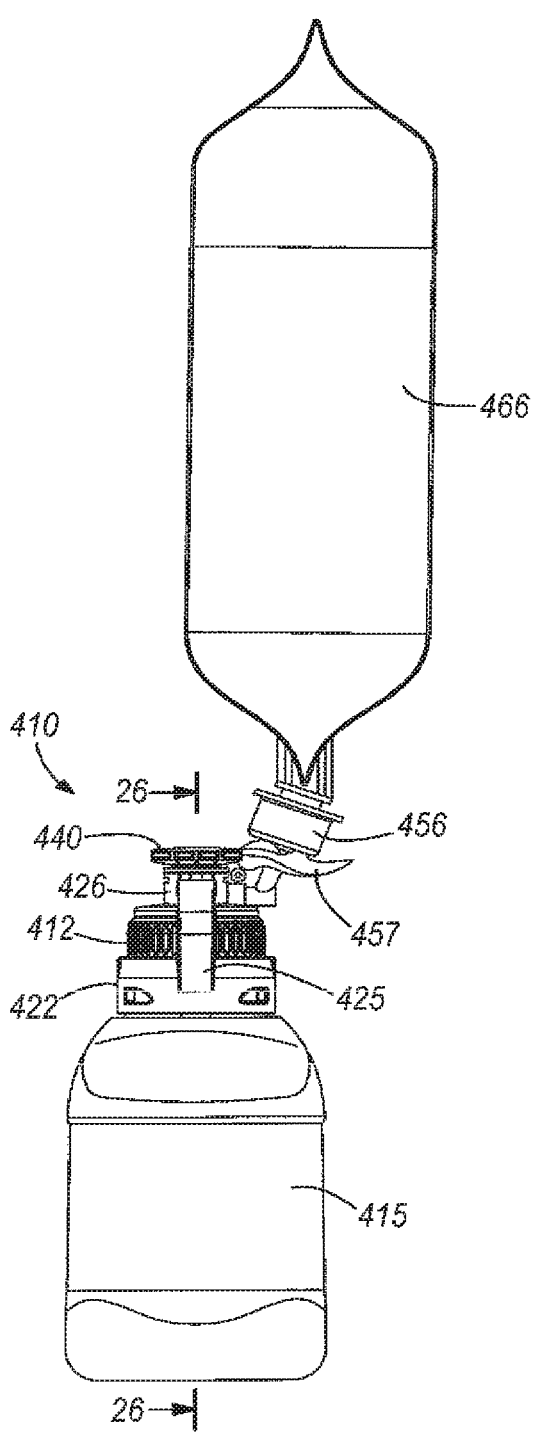
FIG. 21 is a perspective view of a fluid dispenser according to yet another embodiment of the present invention, shown in a first position connected to a refill pouch.
Figure 22:
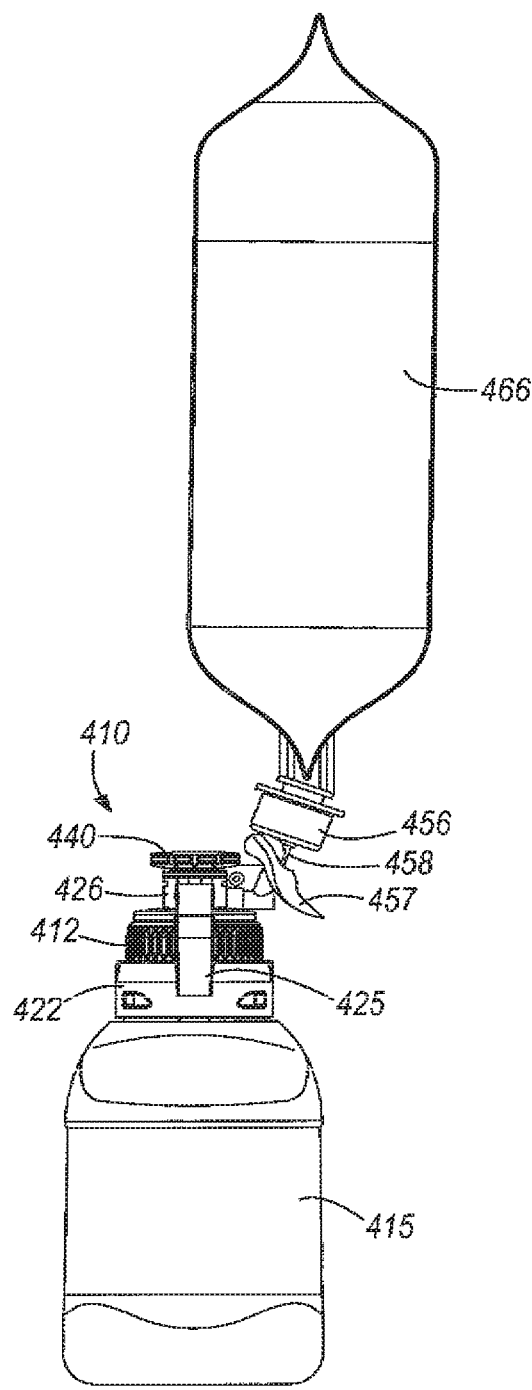
FIG. 22 is a perspective view of the fluid dispenser illustrated in FIG. 21, shown in a second position.

As described above, in some embodiments it is desirable for a user to fill the bottle 415 with a fluid to be dispensed. The fluid dispenser 410 illustrated in FIGS. 21-28 is adapted to be filled through a releasable fluid connection between a fluid source (e.g., refill pouch 466 or other reservoir of fluid) and the fluid dispenser 410. With reference first to FIGS. 21 and 22, the illustrated fluid dispenser 410 is shown in different stages of engagement between portions of a fluid coupling 456, 458 establishing fluid communication between the fluid dispenser 410 and the refill pouch 466. It should be noted that this coupling structure can be used in conjunction with any of the fluid dispenser embodiments described and/or illustrated herein.

Figure 23:
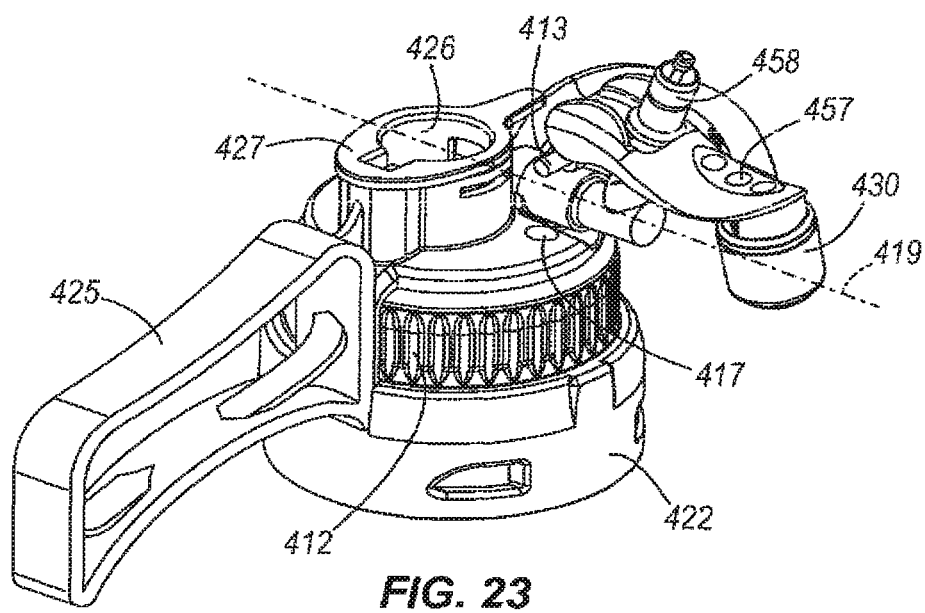
FIG. 23 is a perspective view of a portion of the fluid dispenser illustrated in FIGS. 21 and 22.

With continued reference to FIG. 21, the fluid coupling 456, 458 is shown in a completely engaged state in which fluid communication between the refill pouch 466 and fluid dispenser 410 is established, whereas in FIG. 22, the fluid coupling member 456, 458 is shown in a partially engaged state in which such fluid communication is not established. The illustrated fluid coupling 456, 458 is connectable and disconnectable in two stages. In a first stage, one portion 458 of the fluid coupling (e.g., a male portion 458 as best shown in FIG. 23) is fully engaged with another portion 456 (e.g., a female portion 456), and a cam 457 is in a first rotational position as shown in FIG. 21. In a second stage, the cam 457 is rotated to another rotational position in which the coupling portions 456, 458 are at least partially disengaged from one another as shown in FIG. 22. It should be noted that in other embodiments utilizing male and female coupling portions, the locations of the male and female coupling portions can be reversed from the positions shown in the illustrated embodiment of FIGS. 21-28.

In order to disconnect the coupling portions 456, 458 in the illustrated embodiment, a user rotates the cam 457 (e.g., by depressing a lever portion of the cam 457) from the position shown in FIG. 21 to the position shown in FIG. 22, thereby camming a portion of the cam 457 against a surface of the first portion 456 of the coupling, thereby forcing the coupling portions 456, 458 apart from one another. In some embodiments, the resulting separated position partially disengages a male portion 458 of the coupling from a female portion 456 of the coupling, permitting any residual fluid in the vicinity of the coupling 456, 458 to drain into the dispenser 410 rather than escaping from the coupling 456, 458 and potentially dripping on the user or in the surrounding environment. A user can then pull the portions 456, 458 of the coupling apart to complete separation of the fluid dispenser 410. Although the cam 457 in the illustrated embodiment is shown rotatably attached to the fluid dispenser 410, in other embodiments the cam 457 is rotatably attached to that portion 456 of the fluid coupling associated with the refill pouch 466 or other fluid source, or to any other elements to which the fluid dispenser 410 is releasably coupled for filling the fluid dispenser 410.

As shown in FIGS. 21-25, the coupling 456, 458 enables the fluid dispenser 410 to be releasably engaged with the refill pouch 466, thereby directing fluid from the refill pouch 466 into the fluid dispenser 410 when the coupling 456, 458 is fully engaged with the fluid dispenser 410. The illustrated refill pouch 466 is a flexible bag, such that when fluid is transferred into the fluid dispenser 410, the refill pouch 466 collapses. In other non-illustrated embodiments, the source of fluid can be a bag-in-box, a rigid bottle or other suitable fluid reservoir for holding a quantity of fluid. Further information regarding the coupling 456, 458 and refill pouch 466 shown in the illustrated embodiment (and alternative embodiment information regarding the same) is provided in U.S. Pat. No. 5,967,379, which is incorporated herein by reference insofar as it relates to fluid couplings and refill pouches.

Figure 24:
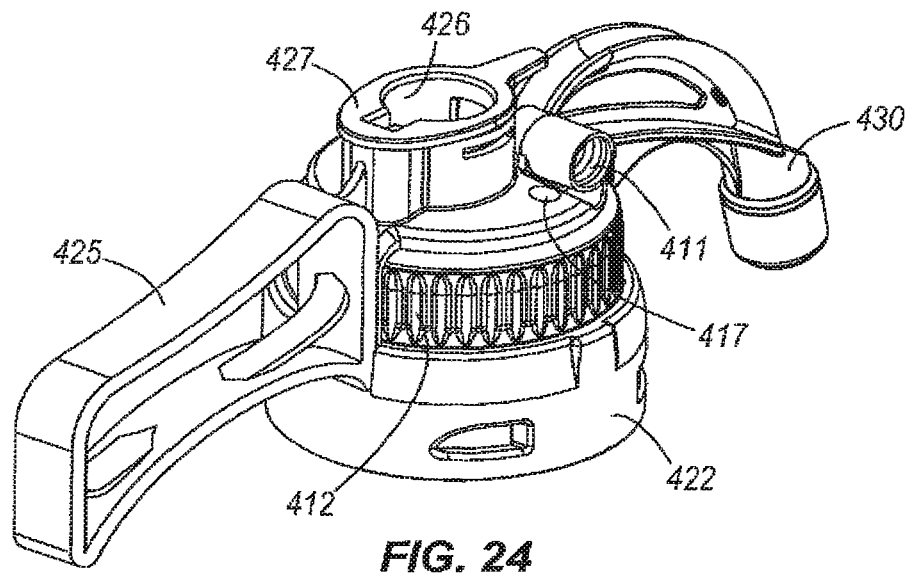
FIG. 24 is another perspective view of a portion of the fluid dispenser illustrated in FIGS. 21-23.
Figure 25:
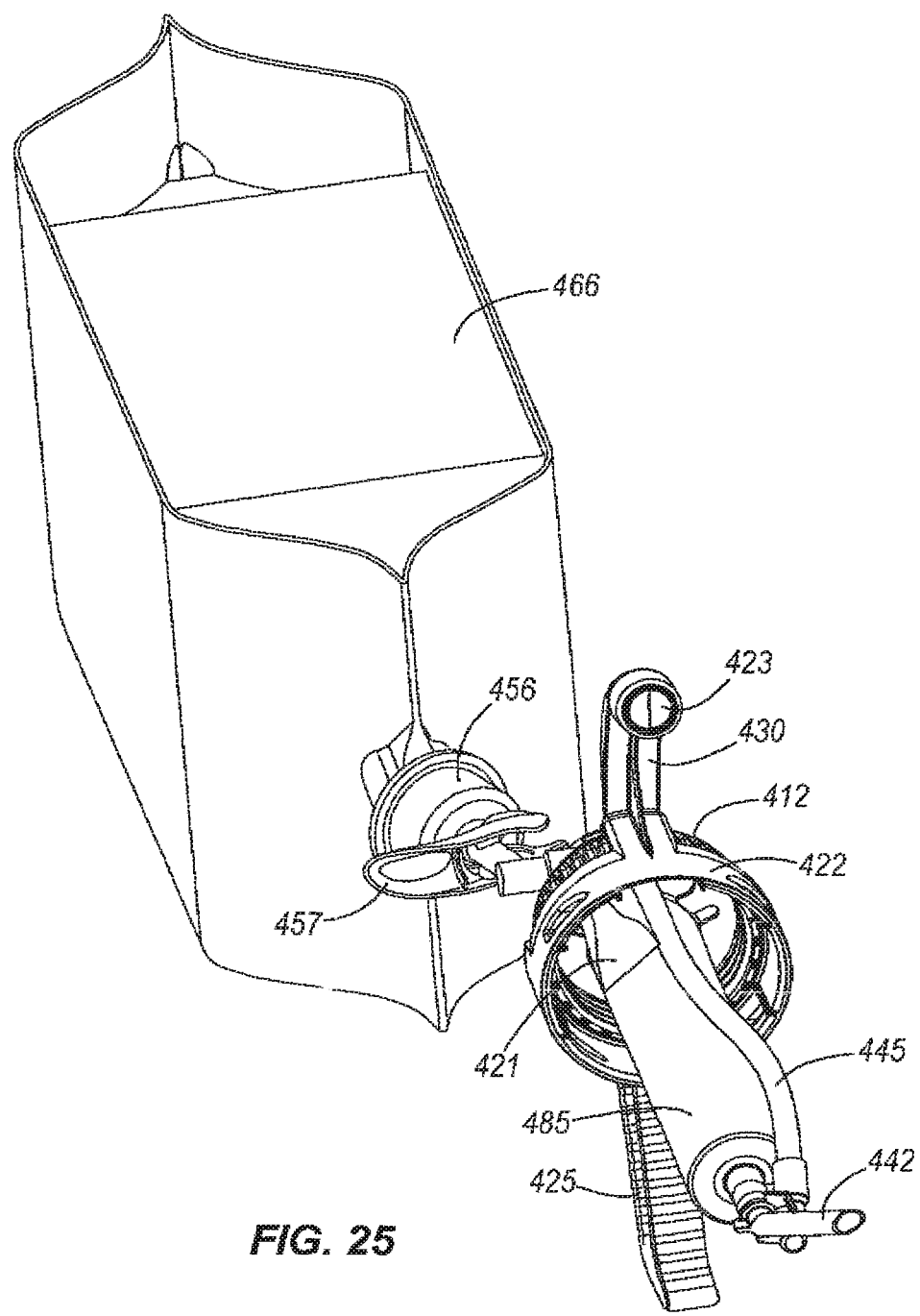
FIG. 25 is a bottom perspective view of a portion of the fluid dispenser illustrated in FIGS. 21-24, shown coupled to the refill pouch.

With reference now to FIGS. 23-25 the illustrated pump body 422 includes a handle 425 graspable by a user, and a collar 426. The handle 425 can take any of the forms described above in connection with the illustrated embodiments of FIGS. 1-20. The collar 426 engages piston 435 (illustrated in FIGS. 26-28), and will be described in move detail below.

In some embodiments, the fluid dispenser 410 is provided with one or more apertures through which air or other gasses within the fluid dispenser (e.g., within the bottle 415) can exit the fluid dispenser 410 as the fluid dispenser 410 is filled with fluid. Such aperture(s) therefore act as vents, and can be located anywhere in the fluid dispenser 410, such as in a top portion of the bottle 415, in the pump body 422, and the like. By way of example only, a single venting aperture 417 is located in the pump body 422 in the illustrated embodiment of FIGS. 21-28.

After filling operations have been performed, it is desirable in some embodiments to prevent the escape of fluid from the fluid dispenser 410 through any venting apertures, such as by plugging or otherwise closing such apertures. With reference again to the illustrated embodiment of FIGS. 21-28, a plug 413 projects adjacent the cam 457, and is movable into and out of engagement with the aperture 417 in the pump body 422. In some embodiments, the plug 413 is rotatably coupled to the fluid dispenser (e.g., the pump body 422), and is rotatable into and out of engagement with the aperture 417. For example, the cam 457 and a portion of the coupling 458 in the illustrated embodiment are pivotable about an axis 419 to insert the plug 413 into the aperture 417, and thus to inhibit fluid from spilling from the fluid dispenser 410 even if the fluid dispenser 410 is turned upside-down. In some alternative embodiments, the aperture 417 is plugged by a stationary plug (not shown) that can be pushed or tuned to close, or can be automatically closed by a floating valve, whereas in other embodiments, the aperture 417 does not exist.

The plug 413 can be made from the same or different material as the pump body 422. For example, in some embodiments the plug 413 can be made in a two-shot mold, such that the plug 413 comprises a softer and/or more resiliently deformable material than the rest of the fluid fitting coupled to the pump body 422 (and from which the plug 413 extends), thereby providing an improved fluid-tight seal with the aperture 417.

FIG. 24 illustrates the pump body 422 with the cam 457 and the coupling portion 458 removed, exposing an aperture 411 through which fluid flows into the fluid dispenser 410 during filling operations.

With reference now to FIG. 25, in some embodiments, the fluid dispenser 410 is provided with a one-way valve through which fluid entering the fluid dispenser (e.g., from the refill pouch 466) passes. The use of such a valve can protect against fluid backflow or escape from the fluid dispenser 410. In the illustrated embodiment, for example, a bag valve 421 is provided within the pump body 422 generally below the aperture 411, and is in fluid communication with the coupling 426, 428. The bag valve 421 can include a flexible polymer member having two side portions that are normally adjacent one another in a closed position of the bag valve 421. When fluid enters the fluid dispenser 410 through the aperture 411, the bag valve 421 is opened, but in other states is normally closed. Even if the fluid dispenser 410 is turned upside-down, fluid in the fluid dispenser 410 presses the bag valve 421 shut to inhibit leakage.

Also with reference to FIG. 25, in some embodiments, the fluid dispenser 410 is provided with a one-way valve (e.g., a mitral valve in the illustrated embodiment) in or associated with the fluid dispenser spout 430. The use of such a valve can protect against fluid dripping from the dispenser spout 430 and/or can prevent air from entering the fluid dispenser 410 through the spout 430. For example, the mitral valve 423 in the illustrated embodiment includes a slit that is normally biased shut, and opens when fluid is dispensed through the spout 430. In addition or in lieu of the mitral valve 423, a quantity of foam, such as reticulated foam, can be positioned adjacent the end of spout 430. The reticulated foam includes openings that can retain fluid to inhibit leakage and to keep the pump of the fluid dispenser 410 primed. The reticulated foam can further decelerate flow through the mitral valve 423 to thereby inhibit lateral or stray fluid squirting action through the mitral valve 423. When placed in lieu of or adjacent the mitral valve 423, the reticulated foam can further decelerate the velocity of the flow out of spout 430 to thereby inhibit lateral or stray fluid and squirting action from spout 430.

After fluid has entered the fluid dispenser 410 (either through the aperture 411 or in any other manner), fluid is eventually drawn into the pump chamber 424 by the piston 435. In some embodiments, fluid is drawn into the pump chamber 424 through a conduit 442. Although the conduit 442 can extend downward in a substantially vertical direction as with earlier-described embodiments, the conduit 442 in the illustrated embodiment of FIGS. 21-28 is instead angled diagonally downward from the pump cylinder 485. In this regard, it should be noted that fluid can be supplied to the pump chamber 424 through a substantially vertical conduit or through a conduit extending in an oblique direction (with respect to a horizontal plane) in any of the fluid dispenser embodiments described and/or illustrated herein. In those embodiments in which the conduit 442 extends at an oblique angle, the angle can be between 30 degrees and 90 degrees with respect to a horizontal plane. For example, in an embodiment that includes a 1.5 L bottle 415, the conduit 442 can be oriented diagonally downward with respect to a horizontal plane (e.g., see FIG. 25), whereas in an embodiment that includes a 5 L bottle 415, the inlet 442 can extend substantially vertically downward. The conduit 442 can be angled to substantially touch the base of the bottle 415 and thereby empty most or all of the liquid from the bottle 415.

As with other embodiments of the present invention, movement of the piston 435 in an upward direction draws fluid into the pump chamber 424 by a resulting suction force generated within the pump chamber 424. A piston seal 455 on the piston 435 can provide a fluid-tight seal with respect to the pump cylinder 485 so that this suction force can be maintained as the piston 435 is moved. It should be noted that the size of the piston seal 455 can be selected according to the size of the fluid dispenser 410, pump cylinder 485, and piston 435. For example, for smaller fluid dispenser embodiments (e.g., 1.5 L bottle embodiments with pumps having a pump chamber capacity of up to about 40 mL) a smaller piston seal 455 can be used in a liner (not illustrated, but similar to either insert 170 or insert 270 illustrated in FIGS. 6 and 10) in comparison to a larger piston seal 455 used with an insert in larger fluid dispenser embodiments (e.g., pumps having a pump chamber capacity of up to 75 mL or greater). In those embodiments in which a liner is used as described earlier, the liner can be injection molded and can be sealed at both the bottom and top to insure that proper dosing can be obtained without leakage. The liner and a smaller piston seal 455 can be used for smaller shot sizes and can increase the prime reliability and dosage accuracy. The liner can be used with any size bottle.

Figure 26:
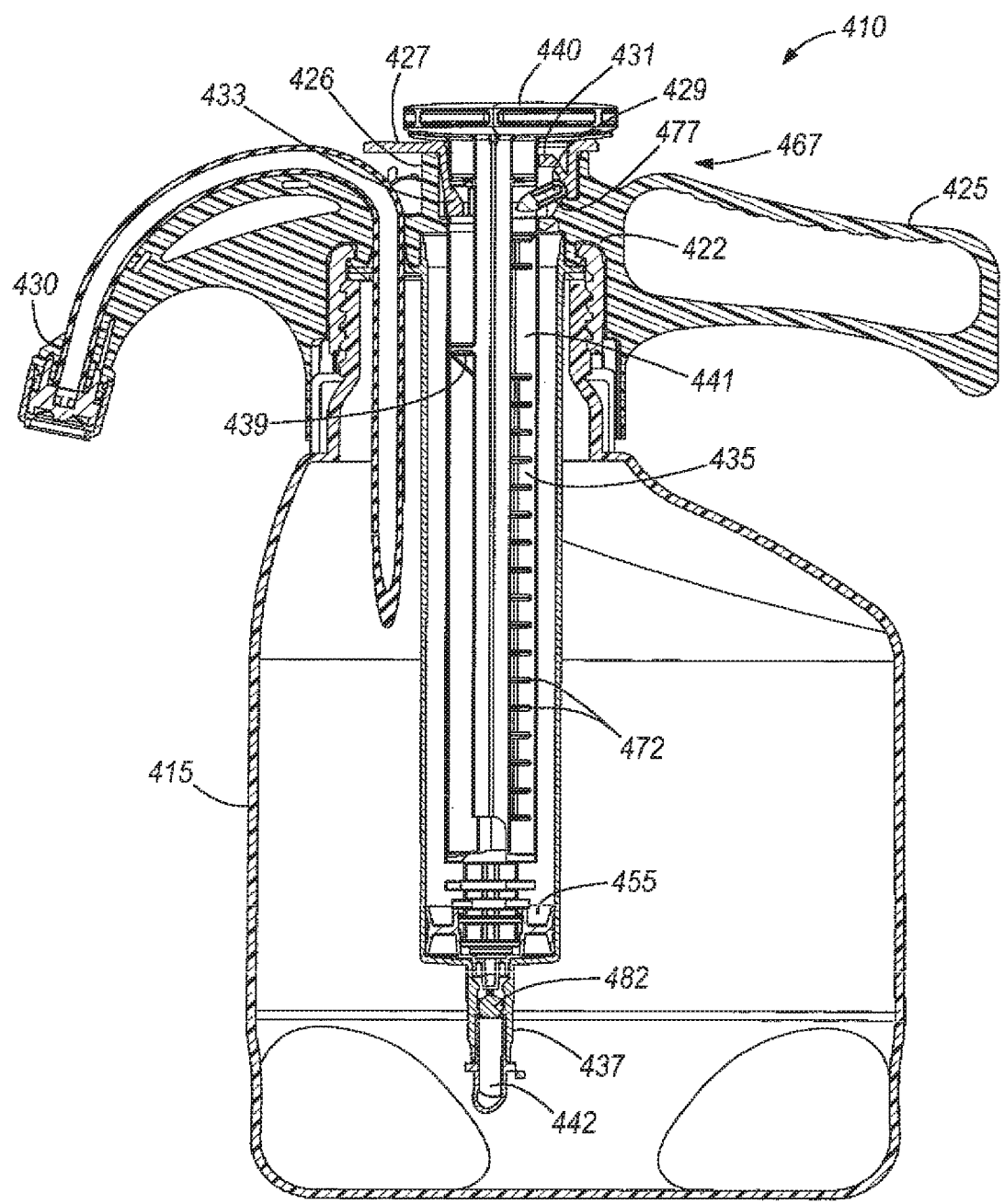
FIG. 26 is a cross-sectional view of the fluid dispenser shown in FIGS. 21-25, taken along line 26-26 of FIG. 21.

With reference now to FIG. 26, the illustrated piston seal 455 is coupled to the piston 435 by a snap fit or other permanent or semi-permanent connection. In addition to performing the suction-generating function described above, the piston seal 455 can inhibit fluid leakage from the bottle 415 during transport. In some embodiments, the portion of the piston 435 adjacent the piston seal 455 can contact and retain a ball 482 of a one-way valve 437 into engagement with a valve seat to close the valve, or can otherwise engage and close any other type of valve used between the bottle 415 and pump chamber 424. This closure can further prevent fluid from entering the pump chamber 424 (and then to other areas of the fluid dispenser 410), and thereby inhibits fluid leakage during transport or when the fluid dispenser 410 is not in use.

FIG. 26 also shows, among other things, the fluid dispenser 410 described above, along with the pump body 422, the collar 426, a collar insert 427, the piston 435, and a pawl 477. The piston 435 is moveable into and out of the fluid dispenser 410 through the collar 426 and collar insert 427, whereas the collar 426 and collar insert 427 do not move with respect to the fluid dispenser 410. The piston 435 includes a user-manipulatable control 440 that is similar to the user-manipulatable control 40 in FIGS. 1 and 2, but can take any of the forms described in any of the embodiments herein. The collar insert 427 supports the pawl 477 for rotation about a pin 429, although in other embodiments the pawl 477 is rotatably attached to the collar 426 or other portion of the fluid dispenser 410 adjacent the piston 435.

With continued reference to the illustrated embodiment, the pawl 477 is attached adjacent a resilient and deformable support 431 which deforms under shear loads experienced by the pawl 477 (e.g., when larger forces are exerted upon the piston 435 by a user). By utilizing a deformable support 431 (of the collar insert 427 or collar 426) adjacent the pawl 477, excessive loads upon the piston 435 are less likely to shear the pin 429 or to otherwise damage the pawl 477 or the pivotable connection of the pawl 477. The resilience of the deformable support 431 can bias the pawl 477 to a neutral or substantially horizontal position to aid direction reversal as will be described in greater detail below. In some embodiments, first and second deformable supports 431 are positioned on the respective top and bottom of the pawl 477 to bias the pawl 477 into a substantially horizontal position.

Figure 27:
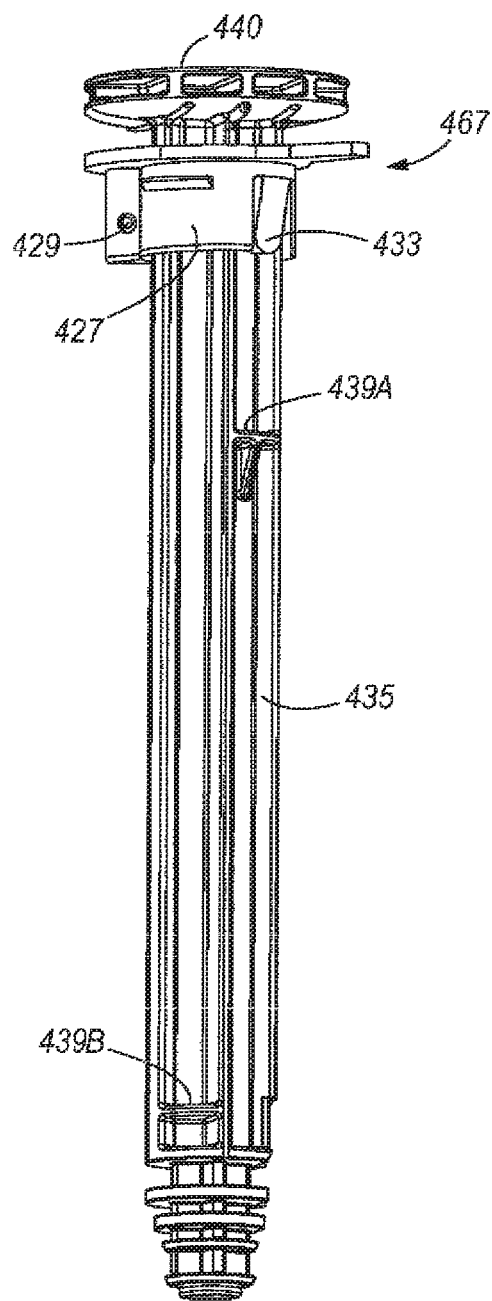
FIG. 27 is a side view of the piston shown in the embodiment of FIGS. 21-26.

In some embodiments, and as shown in FIG. 27 by way of example, the collar insert 427 can support a resiliently deformable stop 433, which can take any of the forms described above in connection with the protrusion 61 of the collar 26 in the embodiment of FIGS. 1-4. The stop 433 is engagable with the piston 435 such that the stop 433 can deform to permit piston insertion into the dispenser 410 while also inhibiting piston removal from the collar 426 once inserted.

Figure 28:
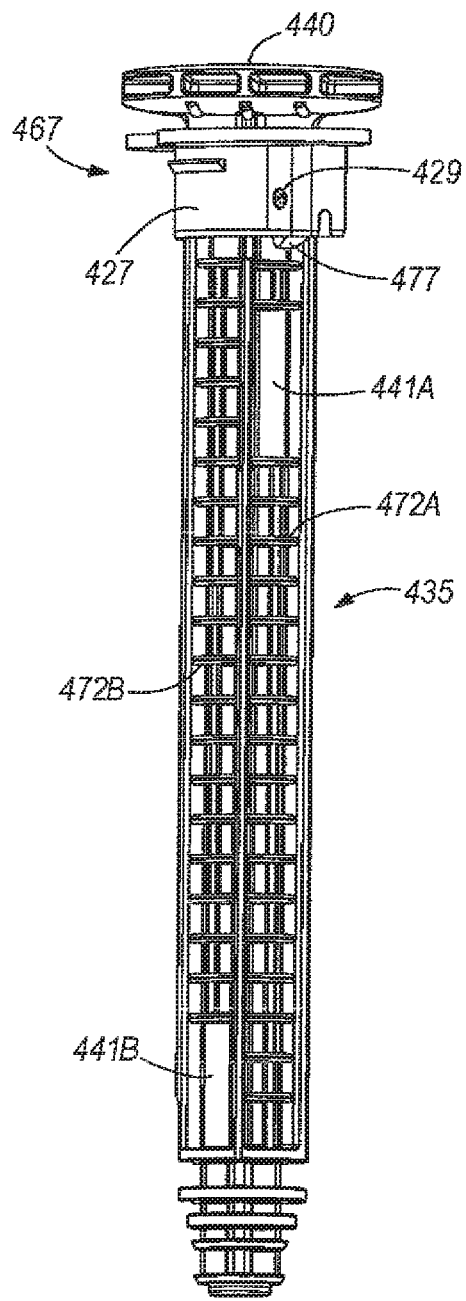
FIG. 28 is another side view of the piston shown in the embodiment of FIGS. 21-26.

As described above, fluid dispensers according to some embodiments of the present invention utilize a ratchet mechanism (i.e., teeth selectively engagable by an adjacent element referred to generically herein as a "pawl") to limit or otherwise control piston movement. The fluid dispenser 410 in the illustrated embodiment of FIGS. 21-28 provides another example of such a ratchet mechanism. With particular reference to FIGS. 26-28, the illustrated piston 435 includes a ratchet mechanism 467 having a number of radially extending teeth 472 and at least one stop 439A, 439B. As discussed above, the ratchet mechanism 467 and stop(s) 439A, 439B can provide dosing control to inhibit under or over-dosing of fluid. A number of features of the ratchet mechanism 467 (and alternatives thereto) are similar in many respects to the ratchet mechanism of FIGS. 9-17B. Therefore, only the primary differences between the ratchet mechanism 267 in the illustrated embodiment of FIGS. 9-17B and the illustrated embodiment of FIGS. 21-28 will now be described. For a more complete description of the ratchet mechanism 467 and alternatives thereto, reference is hereby made to the description above regarding embodiments of the present invention in connection with FIGS. 9-17B.

As described above, the pawl 477 in the illustrated embodiment of FIGS. 21-28 is rotatable about a pin 429 rather than being resiliently deformable, although a combination of these features is possible in other embodiments. The illustrated pawl 477 pivots when pushed against the teeth 472 of the piston 435. In some embodiments, the pawl 477 has an elongated teardrop shape, wherein the narrower end of the pawl 477 engages the teeth 472 of the piston 435. In other embodiments, the pawl 477 can take any other shape capable of performing this function. The illustrated pawl 477 is biased toward the teeth 472 of the piston 435 by the resiliently deformable support members 431.

The illustrated stop 439A is generally wedge-shape, and projects radially from the piston 435 to inhibit movement of the piston 435 through the collar insert 427 when the resilient stop 433 engages the stop 439A. In other embodiments, other shapes and forms of the stop 439A capable of performing this function are possible, and fall within the spirit and scope of the present invention.

FIGS. 27 and 28 show opposite sides of the piston 435 illustrated in the embodiment of FIGS. 21-28. As best shown in FIGS. 27 and 28, the piston 435 has first and second stops 439A, 439B and first and second columns of radially extending teeth 472A, 472B. The first stop 439A is positioned in line with the resilient stop 433 when the first column of teeth 472A engage the pawl 477.

The piston 435 illustrated in FIGS. 27 and 28 can be used to dispense two different dose sizes of fluid from the fluid dispenser 410. In one rotational position of the piston 435 with respect to the collar 426, collar insert 427, and pawl 477, the piston 435 can be drawn upward a first distance prior to engagement between the resilient stop 433 and the first stop 439A, during which time reversal of piston movement is blocked by pawl engagement with teeth of the piston 435. More specifically, when the resilient stop 433 abuts the first stop 439A, the pawl 477 is positioned in a first toothless portion 441A of the piston 435. As discussed above, the teeth 472 pivot the pawl 477 upward when the piston 435 is moved upward, and thus inhibit movement of the piston 435 downward until the pawl 477 encounters the first toothless portion 441A. The pawl 477 is permitted to rotate back toward a horizontal position in the first toothless portion 441A, such that the piston 435 can be pushed down into the dispenser 410. Therefore, the pawl 477 and the teeth 472 inhibit partial dosing of fluid during dispensing.

In another rotational position of the piston 435 with respect to the collar 426, collar insert 427, and pawl 477, the piston 435 can be drawn upward a greater second distance prior to engagement between the resilient stop 433 and the second stop 439B, during which time reversal of piston movement is blocked by pawl engagement with teeth 472B of the piston 435. More specifically, when the resilient stop 433 abuts the second stop 439B, the pawl 477 is positioned in a second toothless portion 441B of the piston 435. The teeth 472B pivot the pawl 477 upward when the piston 435 is moved upward, and thus inhibit movement of the piston 435 downward until the pawl 477 encounters the second toothless portion 441B. The pawl 477 is permitted to rotate back toward a horizontal position in the second toothless portion 441B, such that the piston 435 can be pushed down into the dispenser 410. Therefore, the pawl 477 and the teeth 472B inhibit partial dosing of fluid during dispensing. In some embodiments, the amount of fluid dispensed for each stroke of the piston 435 in the first rotational position is about ⅒th that dispensed for each stroke of the piston 435 in the second rotational position. It will be appreciated that other ratios are possible, and fall within the spirit and scope of the present invention.

Further, the stops 433 and 439 and ratchet mechanism 467 inhibit partial-dosing or over-dosing of fluid during dispensing. These components work together to assure proper dosing of fluid for a given position of the piston 435.

In some embodiments, the teeth 472A, 472B, toothless portions 441A, 441B, and stops 439A, 439B on the piston 435 can be adjusted and or set by coupling one or more elements (e.g., profiled strips, tracks, and the like) to the piston 435. In some embodiments, these elements are made of metal, whereas in other embodiments, these elements are made of plastic, ceramic, or other materials. These elements can be coupled to and removed from the piston 435 to change the length of travel of the piston 435, thereby enabling a single piston 435 to be used for multiple pairs of dosing quantities or by eliminating one track to have different single dosing quantities. In these and other embodiments, the piston 435 can be removed and replaced with another piston 435 having a different shape to define different stroke lengths of the piston 435 to change the quantities of fluid that can be dispensed by actuation of the piston 435.

FIGS. 29-33 illustrate yet another embodiment of a fluid dispenser 510 according to the present invention. This embodiment employs much of the same structure and has many of the same properties as the embodiments of the fluid dispensers 10, 110, 210, 310, and 410 described above in connection with FIGS. 1-28. Accordingly, the following description focuses primarily upon structure and features that are different than the embodiments described above in connection with FIGS. 1-28. Reference should be made to the description above in connection with FIGS. 1-28 for additional information regarding the structure and features, and possible alternatives to the structure and features of the dispenser 510 illustrated in FIGS. 29-33 and described below. Features and elements in the embodiment of FIGS. 29-33 corresponding to features and elements in the embodiments described above in connection with of FIGS. 1-28 are numbered in the 500 series of reference numbers.

FIGS. 29-33 illustrate a fluid dispenser 510 similar in many respects to the fluid dispenser 410 described above and illustrated in FIGS. 21-28. The illustrated fluid dispenser 510 can be refilled via an arm 559 pivotably coupled to the pump body 522 adjacent a spout 530. The end of the arm 559 can be inserted into a refill pouch as described above and shown in FIGS. 21, 22 and 25, or into any other compatible fluid container. By way of example, the illustrated arm 559 includes a pair of extensions 569 that are adapted to unseat a valve (e.g., the ball of a ball valve) in the refill container. Similar to the embodiment of FIGS. 21-29, the arm 559 and extensions 569 can inhibit leakage of fluid during refilling.

The fluid dispenser 510 illustrated in FIGS. 29-33 includes a button 571 (see FIGS. 29 and 31) to vent air or other gasses from the fluid dispenser 510, such as during filling operations or vent air in after dispense of fluid from the fluid dispenser 510. The button 571 can be selectively depressed by a user to allow air to flow out of the dispenser 510, but can inhibit fluid leaking out of the fluid dispenser 510 when the button 571 is not depressed. The button 571 can be used in conjunction with the aperture 417 of the previous illustrated embodiment, or can be used in place of the aperture 417. In some embodiments, the button 571 can be replaced with a ball valve or a threaded plug.

As with other embodiments described and/or illustrated herein, the piston 535 can be made of a single piece of material. However, the piston 535 of the fluid dispenser embodiment shown in FIGS. 29-33 includes two primary portions: a first portion 535A that includes a user-manipulatable control 540 and teeth 572A, and a second portion 535B that includes locking members 573 that permit insertion of the second portion 535B into the first portion 535A but inhibit subsequent withdrawal of the second portion 535B from the first portion 535A. Although two locking members 573 are shown in the embodiment of FIGS. 29-33, any number of such locking members 573 having the same or other shapes performing the same function can instead be used. The multi-portion piston construction in the embodiment of FIGS. 29-33 can provide advantages for manufacturing, as well as adaptation of the piston 535 to different fluid dose sizes and numbers.

The piston 535 illustrated in the embodiment of FIGS. 29-33 includes teeth 572A (see FIG. 30) that engage a pawl 577 (see FIG. 33) defined by a portion of a collar insert 527. The pawl 577 permits the piston 535 and teeth 572A to move downward into the fluid dispenser 510, but inhibit movement upward out of the fluid dispenser 510 by pawl engagement with the teeth 572A. In contrast, the piston 535 includes a second set of teeth 572B that can be smaller than teeth 572A, and are angled downward. When the teeth 572B are engaged with a secondary pawl 579, the piston 535 is permitted to move upward out of the fluid dispenser 510, but is inhibited from moving downward into the fluid dispenser 510. Therefore, the rotational position of the piston 535 shown in FIGS. 32 and 33, the piston 535 cannot be pushed in or pulled from the fluid dispenser 510. Accordingly, this rotational position of the piston 535 is a locked position, and is indicated at 536 in FIG. 30.

In order to unlock and dispense fluid from the fluid dispenser 510, the piston 535 is rotated via the user-manipulatable control 540 such that pawl 577 engages axial aperture 562 to dispense a first quantity of fluid or axial aperture 563 to dispense a second quantity of fluid. When the piston 535 is pulled in an upward direction, the pawls 577 does not engage teeth 572A, but secondary pawl 579 engages teeth 572B. The axial apertures 562 and 563 are shaped (e.g., curved or having one or more legs or angled portions) such that the pawl 577 is directed into a toothless portion 541 after the piston 535 is pulled sufficiently in an upward direction to draw in fluid to be dispensed. When the pawl 577 is positioned in a toothless portion 541, the secondary pawl 579 no longer engages the teeth 572B. Therefore, only one pawl 577, 579 engages teeth of the piston 535 at a given time outside of the locked position 536 of the piston 535 to inhibit partial dosing.

Figure 31:
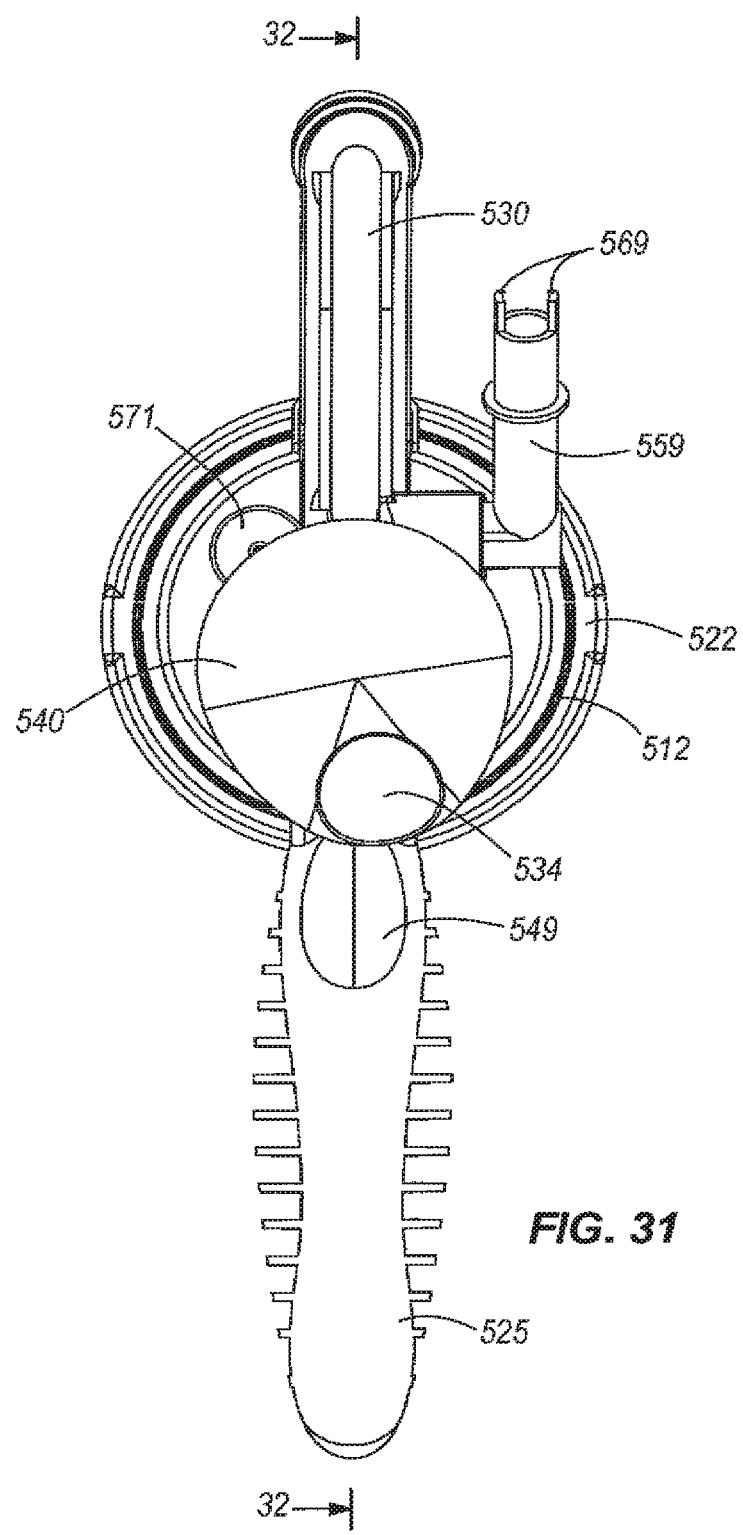
FIG. 31 is a top view of the fluid dispenser shown in FIGS. 29 and 30.

The fluid dispenser 510 illustrated in FIGS. 29-33 includes a handle 525 that is ergonomically shaped to fit the hand of a user. The handle 525 can include a thumb grip portion 549, as shown in FIGS. 29, 31 and 32. Other, previously-described embodiments of fluid dispensers can include a similar thumb grip portion, if desired.

FIGS. 34 and 35 illustrate another embodiment of a fluid dispenser 610 according to the present invention. This embodiment employs much of the same structure and has many of the same properties as the embodiments of the fluid dispensers 10, 110, 210, 310, 410 and 510 described above in connection with FIGS. 1-33. Accordingly, the following description focuses primarily upon structure and features that are different than the embodiments described above in connection with FIGS. 1-33. Reference should be made to the description above in connection with FIGS. 1-33 for additional information regarding the structure and features, and possible alternatives to the structure and features of the dispenser 610 illustrated in FIGS. 34 and 35 and described below. Features and elements in the embodiment of FIGS. 34 and 35 corresponding to features and elements in the embodiments described above in connection with of FIGS. 1-33 are numbered in the 600 series of reference numbers.

The fluid dispenser 610 illustrated in FIGS. 34 and 35 includes a cap 612, a bottle 615, a pump 620, a pump body 622, a handle 625, a spout 630 and a user-manipulatable control 640. Reference is made to the earlier-described embodiments of the present invention for further information regarding these elements. The illustrated fluid dispenser 610 further includes a refill port 643 positioned on the bottle 615 to permit flow of fluid into the bottle 615 for refilling purposes. The refill port 643 can have any size desired, and in some embodiments has a relatively large diameter to permit rapid refill of the bottle 615.

The refill port 643 can be closed by a plug, cover, valve or any other suitable flow inhibiting device. As shown in FIGS. 34 and 35, the illustrated refill port 643 is closed by a knob 647 on the handle 625. In some embodiments, the handle 625 pivots about the cap 612 for this purpose. In other embodiments, the handle 624 is removable from the cap 612 to permit the knob 647 to be inserted into the refill port 643. In other embodiments, a separate plug, cover, valve or other suitable flow inhibiting device can be coupled to the fluid dispenser 610 and can be engaged with the refill port 643 to selectively permit and inhibit flow of fluid therethrough.

FIG. 36 illustrates another embodiment of a fluid dispenser 710 according to the present invention. This embodiment employs much of the same structure and has many of the same properties as the embodiments of the fluid dispensers 10, 110, 210, 310, 410, 510 and 610 described above in connection with FIGS. 1-35. Accordingly, the following description focuses primarily upon structure and features that are different than the embodiments described above in connection with FIGS. 1-35. Reference should be made to the description above in connection with FIGS. 1-35 for additional information regarding the structure and features, and possible alternatives to the structure and features of the dispenser 710 illustrated in FIG. 36 and described below. Features and elements in the embodiment of FIG. 36 corresponding to features and elements in the embodiments described above in connection with of FIGS. 1-35 are numbered in the 700 series of reference numbers.

The fluid dispenser 710 illustrated in FIG. 36 includes a cap 712, a bottle 715, a pump 720, a pump body 722, a handle 725, a spout 730, and a user-manipulatable control 740. The handle 725 is shaped to include a refill port 743 thereon. The refill port 743 can be selectively covered or closed by any of the mechanisms discussed above in connection with any of the other embodiments of the present invention. By way of example only, a refill pouch 766 can include a fluid coupling 756 insertable into the refill port 743, as illustrated in FIG. 36. The refill pouch 766 can be similar to the refill pouch discussed in the embodiment illustrated in FIGS. 21 and 22. A similar refill pouch 766 can also be utilized in connection with the embodiment illustrated in FIGS. 34 and 35. The coupling member 756 can engage the refill port 743 as also discussed above in connection with FIGS. 21 and 22.

FIGS. 37A-40C illustrate a first alternative pawl mechanism that can be used in connection with any of the fluid dispenser embodiments described and/or illustrated herein. This alternative pawl mechanism can be used to prevent or inhibit partial dosing of fluid from any of the fluid dispensers disclosed herein, and is illustrated by way of example only. Other mechanisms can be used to prevent or inhibit partial dosing, and fall within the spirit and scope of the present invention. Also, the mechanism shown in FIGS. 37A-40C can be utilized in any of the above-described embodiments either in combination with or in lieu of any of the other partial dose preventing or inhibiting features.

The pawl mechanism 877 illustrated in FIGS. 37A-40C performs a similar function as the protrusions 61, 165, and pawls 277, 477 and 579 to inhibit or prevent dispensing a partial dose from a fluid dispenser. As used herein and in the appended claims, the term "pawl" is used herein to refer to any element or device which in at least one state or position prevents reverse movement of the subject part or structure.

The illustrated pawl 877 includes a first arm 874 and a second arm 876 coupled to pivot together about a pin 829. The illustrated pawl 877 is coupled to a sleeve (such as insert 870), and selectively engages a first plurality of ratchet teeth 872A and a second plurality of ratchet teeth 872B positioned on a ratchet mechanism 867. The pluralities of teeth 872A, 872B can be located, for example, on a piston of the fluid dispenser.

Figure 37B:
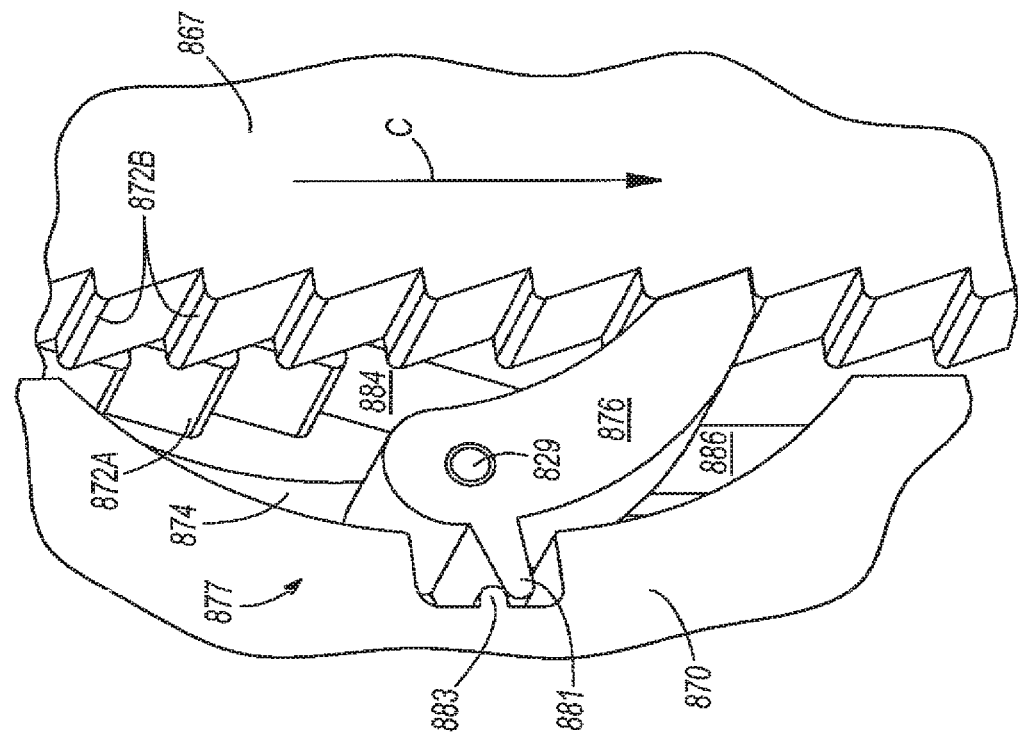
FIGS. 37A and 37B are perspective views of a pawl assembly according to an embodiment of the present invention, shown in first and second positions, respectively.
Figure 37A:
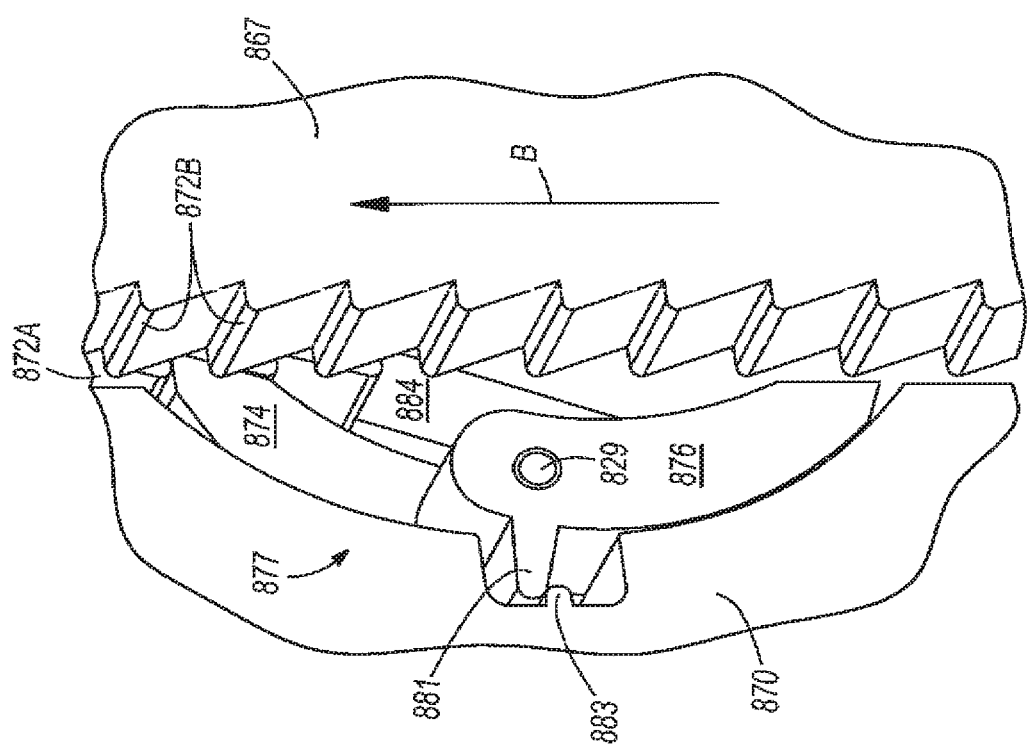

A resilient protrusion 881 can be coupled to either or both the first arm 874 and the second arm 876. Another protrusion 883 can be coupled to the insert 870, and can engage the resilient protrusion 881 as shown in FIGS. 37A-40C. The protrusion 883 can engage the resilient protrusion 881 to bias the first arm 874 and the second arm 876 into engagement with the respective first and second ratchet teeth 872A, 872B. When the ratchet mechanism 867 is moved upward (in the direction of arrow B), the first arm 874 engages the first plurality of ratchet teeth 872A as shown in FIG. 37A. When the ratchet mechanism 867 is moved downward (in the direction of arrow C), the second arm 876 engages the second plurality of ratchet teeth 872B as shown in FIG. 37B.

Figure 38C:
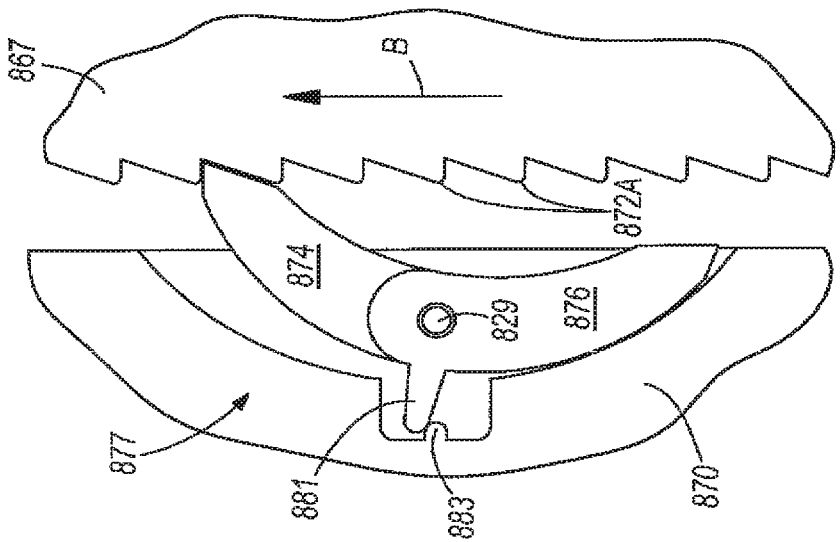
FIGS. 38A-38C are side views of the pawl assembly of FIGS. 37A and 37B, shown in different positions in response to movement of the pawl in a first direction.
Figure 38B:
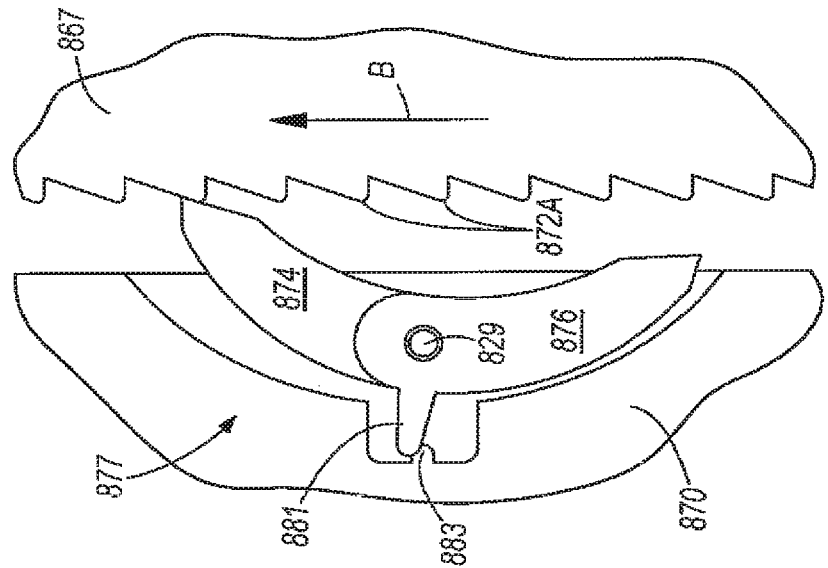
Figure 38A:
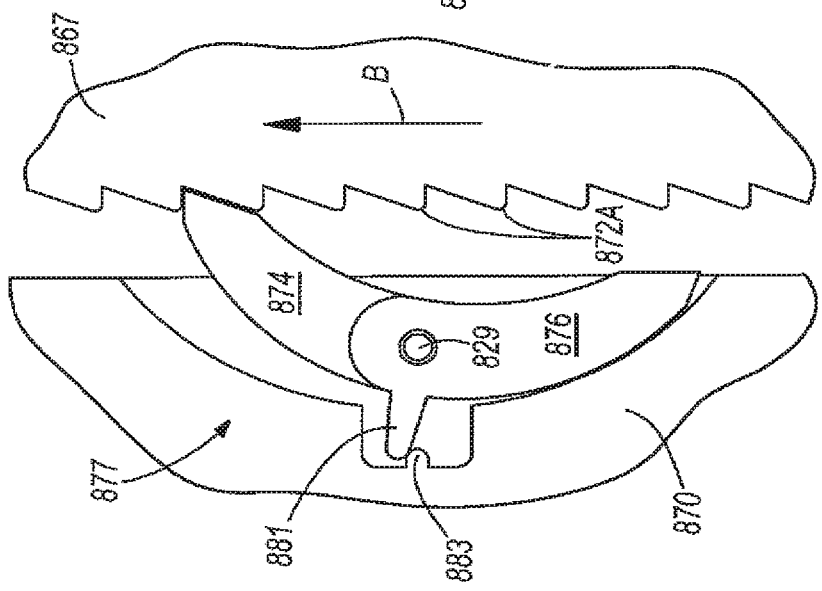

FIGS. 38A-38C show the first arm 874 moving over one of the first plurality of ratchet teeth 872A, as the ratchet mechanism 867 is moved upward in the direction of arrow B. FIG. 38A illustrates the first arm 874 in mating engagement with the one of the ratchet teeth 872A. In the illustrated embodiment, an end of the first arm 874 is shaped to mate with the first ratchet teeth 872A, as shown in FIGS. 38A and 38C. In other embodiments, shapes of the ratchet teeth 872A and the first arm 874 are possible, and fall within the spirit and scope of the present invention. When the ratchet mechanism 867 is moved in the direction of arrow B, the resilient protrusion 881 pivots about the pin 829 and pushes against the protrusion 883 to permit the first arm 874 to move over one of the ratchet teeth 872A, as shown in FIG. 38B. Once the first arm 874 has passed over the ratchet tooth 872A, the resilient protrusion 881 pushes against the protrusion 883 to engage the first arm 874 with the next ratchet tooth 872A, as shown in FIG. 38C.

FIGS. 39A-39C illustrate the first arm 874 moving over the ratchet mechanism and disengaging from the first plurality of ratchet teeth 872A. FIG. 39A shows the first arm 874 after passing over the last of the first plurality of ratchet teeth 874, such that the first arm 874 engages a ramp 884. As the first arm 874 is further moved upward in the direction of arrow B, the first arm 874 travels up the ramp 884 and onto a vertical surface 886, as shown in FIG. 39B. The vertical surface 886 is positioned closer to the pin 829 than the ratchet teeth 872A, such that the vertical surface 886 pushes against the first arm 874. The resilient protrusion 881 is pushed against the protrusion 883, and the resilient protrusion 881 flexes to permit the resilient protrusion 881 to move past the protrusion 883, as shown in FIG. 39C.

After the resilient protrusion 881 has moved to the other side of the protrusion 883, the ratchet mechanism 867 can be moved in an opposite direction, such as downward in the direction of arrow C shown in FIGS. 40A-40C. FIG. 40A illustrates the second arm 876 in engagement with one of the plurality of ratchet teeth 872B, such that an end of the second arm 876 has a mating profile with a profile of the one of the ratchet teeth 872B. In other embodiments, other profiles of the ratchet teeth 872B and the second arm 876 are possible, and fall within the spirit and scope of the present invention. As the ratchet mechanism 867 is moved downward in the direction of arrow C, the second arm 876 is pivoted around pin 829 away from the ratchet mechanism 867 by one of the ratchet teeth 872B, and the resilient protrusion 881 is deformed against the protrusion 883. Once the second arm 876 has passed over the one of the ratchet teeth 872B, the resilient protrusion 881 pushes against the protrusion 883 to engage the second arm 876 with the next ratchet tooth 872B, as shown in FIG. 40C. Although not illustrated, the ratchet mechanism 876 includes a ramp and a vertical surface adjacent the ratchet teeth 872B, similar to the ramp 884 and the vertical surface 886 adjacent the ratchet teeth 872B, to permit the resilient protrusion 881 to engage the other side of the protrusion 883, once the ratchet mechanism 876 has traveled a sufficient distance in the direction of arrow C.

In some embodiments, the position of the ratchet teeth 872A, 872B and the position of the first and second arms 874, 876 can be reversed, such that the ratchet teeth 872A, 872B are coupled to the insert 870 and remain stationary, and the first and second arms 874, 876 are coupled to the ratchet mechanism 867 and move with the ratchet mechanism 867.

FIGS. 41-44 illustrate a second alternative pawl mechanism that can be used in conjunction with any of the fluid dispenser embodiments described and/or illustrated herein to prevent or inhibit partial dosing. This second alternative mechanism is illustrated by way of example only. Other mechanisms can be used to prevent or inhibit partial dosing, and fall within the spirit and scope of the present invention. The mechanism shown in FIGS. 41-44 can be utilized in any of the above-described embodiments, either in combination with or in lieu of any of the other partial dose preventing or inhibiting features. The pawl mechanism 977 illustrated in FIGS. 41-44 performs a similar function as the protrusions 61, 165 and pawls 277, 477, 579 and 877 to inhibit or prevent dispensing a partial dose.

The pawl mechanism 977 illustrated in FIGS. 41-44 includes a ratchet mechanism 967 having a first plurality of teeth 972A and a second plurality of teeth 972B, a ball housing 987, and a ball 988. The ratchet mechanism 967 is moveable with respect to the ball housing 987. The ball 988 is positioned between to engage both the ratchet mechanism 967 and the ball housing 987.

The ball housing 987 includes a recess 989 and a first resilient angled portion 991A and a second resilient angled portion 991B both positioned at least partially within the recess 989. The ball 988 engages the first resilient angled portion 991A when the ratchet mechanism 967 is moved upward, along arrow D, and the ball 988 engages the second resilient angled portion 991B when the ratchet mechanism 967 is moved downward (not illustrated).

Figure 42:
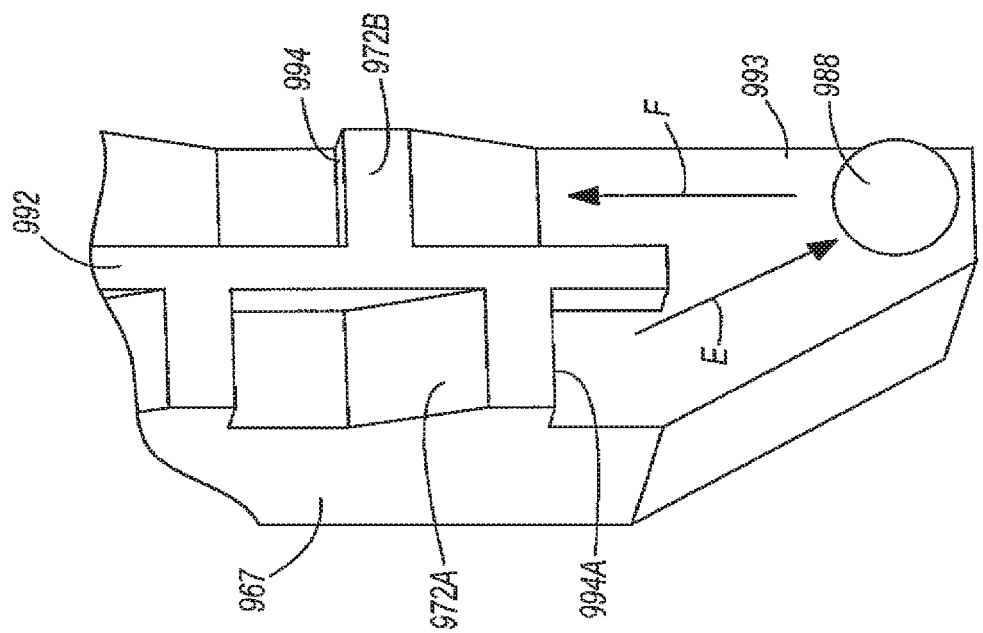
FIG. 42 is a perspective view of a portion of the pawl assembly of FIG. 41, showing a direction change of the pawl assembly.
Figure 41:
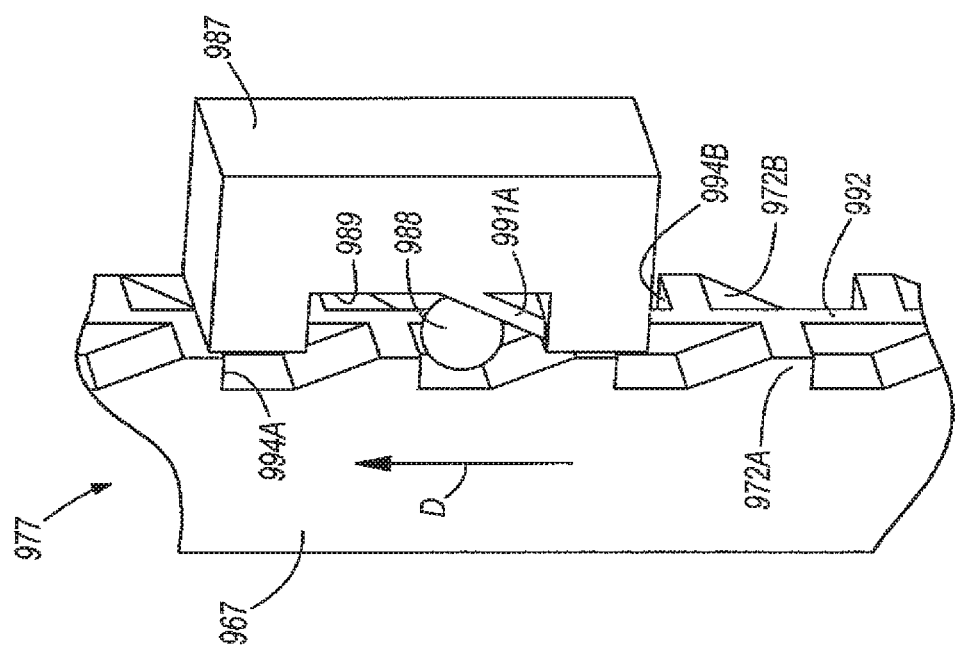
FIG. 41 is a perspective view of a pawl assembly according to another embodiment of the present invention.

FIG. 42 illustrates the transition between the ball 988 engaging the first plurality of teeth 972A and the ball 988 engaging the second plurality of teeth 982B. The ball housing 987 is not illustrated in FIG. 42 to more clearly show the ball 988 and the first and second pluralities of teeth 982A, 982B. The embodiment illustrated in FIG. 41-44 includes a ridge 992 positioned between the teeth 982A, 982B to retain the ball 991 on one side of the ridge 992 until the ball 991 has moved a determined length along the ratchet mechanism 967. After moving the determined length along the ratchet mechanism 967 the ball 991 moves over a toothless portion 993, which can be substantially planar. The toothless portion 993 permits the ball 991 to transfer between engagement with the first plurality of teeth 982A and the second plurality of teeth 982B, as indicated by arrow E and arrow F in FIG. 42. Although not specifically illustrated, at least one other toothless portion can be positioned at various locations along the ratchet mechanism 967 to permit the ball 988 to transfer between engagement with the first plurality of teeth 982A and the second plurality of teeth 982B.

Figure 43D:
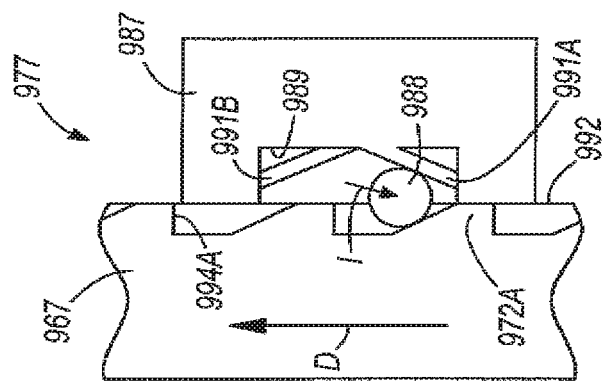
FIGS. 43A-43D are side views of the pawl assembly of FIGS. 41 and 42, shown with a ratchet moving with respect to a housing of the ball.
Figure 43C:
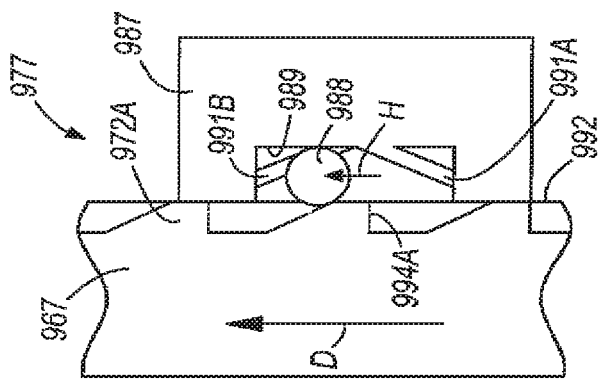
Figure 43B:
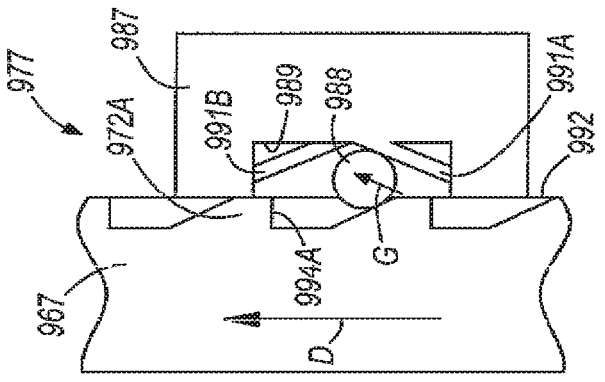
Figure 43A:
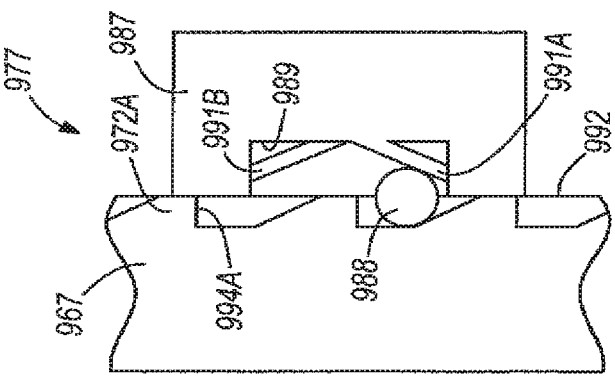

FIGS. 43A-43D illustrate the ball 988 moving over one of the first plurality of teeth 972A. The ball 988 is shown in engagement with the first resilient angled portion 991A and the ratchet mechanism 967 in FIG. 43A. As the ratchet mechanism 967 is moved upward along arrow D, as shown in FIG. 43B, the one of the plurality of teeth 972A moves the ball 988 upward along the first resilient angled portion 991A, in the direction of arrow G. The one of the plurality of teeth 982A moves the ball 988 further upward in the recess 989 along arrow H, as illustrated in FIG. 43C. The ball 988 illustrated in FIG. 43C is adjacent, but not in direct contact with the second resilient angled portion 991B, as the ratchet mechanism 967 moves in the direction of arrow D. After the one of the plurality of teeth 972A passes by the ball 998, the ball 998 is permitted to fall down against the first resilient angled portion 991A and an adjacent one of the plurality of teeth 972A in the direction of arrow I and under the force of gravity, as shown in FIG. 43D. Although only travel in the direction of arrow D is shown and described, travel in a direction opposite of arrow D would inherently operate in much the same way. At the top or bottom of movement of the ratchet mechanism 967, the ball 988 is moved to engage teeth facing the opposite direction, such as shown in FIG. 42. Therefore, travel in a direction opposite of arrow D would create engagement between the ball 988, the second plurality of ratchet teeth 972B and the second resilient angled portion 991B and would operate similarly to the operation described above.

Figure 44:
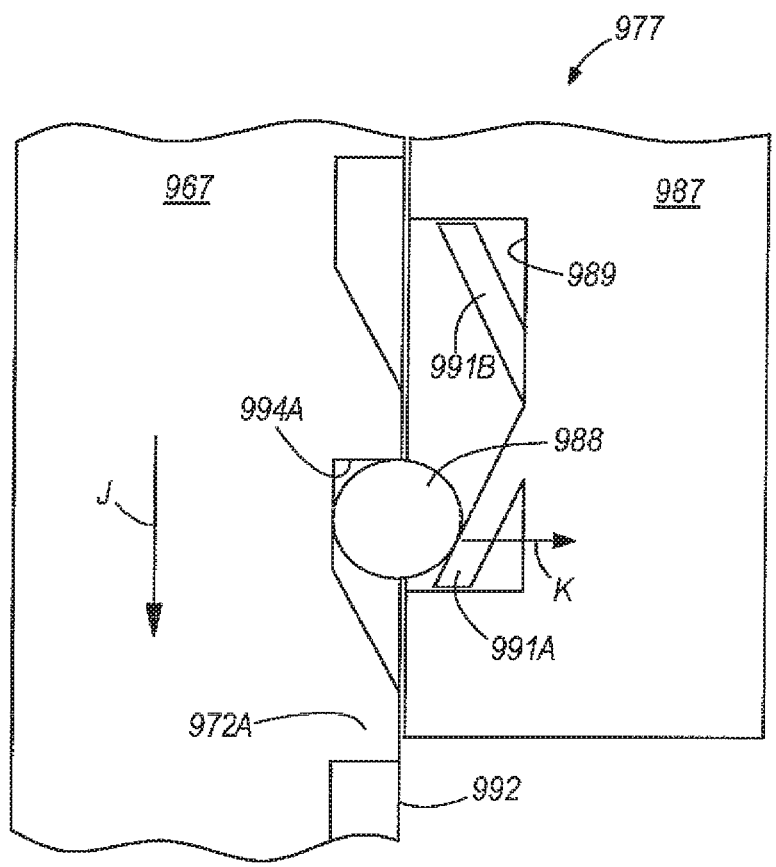
FIG. 44 is a side view of the pawl assembly of FIGS. 41-43D in a position to prevent reverse movement.

FIG. 44 shows the ratchet mechanism 967 pushing against the ball 988 in a direction opposite arrow D, particularly along arrow J. To prevent travel in this direction, the teeth 972A include a flat ridge 994A that engages the ball 988 and pushes the ball 988 against the first resilient angled portion 991A in the direction of arrow K. The flat ridge 994A thereby prevents movement in the direction of arrow J while the ball 988 is in engagement with the first resilient angled portion 991A, as shown in FIG. 44. Although not illustrated, when the ball 988 is engaged with the second resilient angled portion 991B, a flat ridge 994B (see FIG. 41) prevents movement in a direction opposite to the direction of travel, similar to the flat ridge 994A described above and illustrated in FIG. 44.

In any of the above-described embodiments, two or more quantities of fluid can be dispensed from a fluid dispenser. In some embodiments, the two quantities can have a ratio of around about 10:1. By way of example only, in a given embodiment, a first dispensed quantity of fluid can be about 7 mL by moving the piston into the dispenser about 4-5 mm, whereas a second dispensed quantity of fluid can be about 75 mL by moving the piston into the dispenser about 150 mm. Other quantities, ratios and distances are also possible, and fall within the spirit and scope of the present invention.

It is important to note that fluid can be dispensed from each of the fluid dispensers described and/or illustrated herein without requiring a source of water or other fluid to actuate the dispenser. No working fluid, nor the velocity, impact, weight, or mass of such a fluid is required in operation of the various disclosed fluid dispensers.

In any of the above-described fluid dispenser embodiments, an audible confirmation (in addition to the visual confirmation provided by the indicia described above), can be used to indicate to a user and/or to those in the vicinity of the dispenser 10 the size of the fluid dose being dispensed. For example, the audible confirmation could be a short beep for smaller dispense sizes and a longer beep for larger dispense sizes, a low beep and a high beep for different dispense sizes, or a number of clicks (e.g., from piston movement in either direction generating sound of the pawl upon one of the disclosed ratcheting mechanisms) corresponding to fluid dispense volume.

In any of the above-described embodiments, a time-delay option can be included to inhibit over-dispensing of fluid from the dispenser 10. Time-delay dispenser features are disclosed in U.S. Pat. No. 5,908,163, which is incorporated by reference for the disclosure of such features.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Various features and advantages of the invention are set forth in the following claims.

The invention claimed is:

1. A fluid dispenser for containing and dispensing metered amounts of fluid, the fluid dispenser comprising:
   a reservoir configured to contain fluid;
   a chamber positioned in fluid communication with the reservoir for containing a quantity of the fluid;
   a piston movable relative to the chamber to draw fluid into the chamber when the piston is moved in a first direction, and to discharge fluid from the chamber when the piston is moved in a second direction opposite the first direction,
   wherein the piston has a first rotational position defined about an axis extending longitudinally along the length of the piston, a second rotational position defined about the axis, and a third rotational position defined about the axis,
   wherein the piston is rotatable within a single plane between each of the first rotational position, the second rotational position, and the third rotational position,
   wherein the piston is movable a first distance along the axis in the first rotational position to draw a first predetermined amount of fluid into the chamber, the piston is movable a second distance along the axis in the second rotational position to draw a second predetermined amount of fluid into the chamber, and the third rotational position is configured to inhibit movement of the piston in the first direction along the axis, and
   wherein the second distance is different from the first distance.

2. The fluid dispenser of claim 1, further comprising a user-manipulatable control coupled to the piston to rotate the piston between the first rotational position, the second rotational position, and the third rotational position.

3. The fluid dispenser of claim 2, wherein the user-manipulatable control is further configured to move the piston linearly along the axis.

4. The fluid dispenser of claim 2, further comprising indicia disposed on the user-manipulatable control and representative of the first and second predetermined amounts of fluid.

5. The fluid dispenser of claim 1, wherein, in the first rotational position, the piston is only movable the entirety of the first distance in the first direction prior to being moved in the second direction.

6. The fluid dispenser of claim 5, wherein, in the second rotational position, the piston is only movable the entirety of the second distance in the first direction prior to being moved in the second direction.

7. The fluid dispenser of claim 1, wherein at least a portion of the piston is changeable to provide at least one different rotational position corresponding to a third predetermined amount of fluid configured to be drawn into the chamber.

8. The fluid dispenser of claim 1, wherein the first rotational position aligns with a first elongated aperture extending the first distance, and the second rotational position aligns with a second elongated aperture extending the second distance.

9. A fluid dispenser for containing and dispensing metered amounts of fluid, the fluid dispenser comprising:
   a reservoir configured to contain fluid;
   a chamber positioned in fluid communication with the reservoir for containing a quantity of the fluid;
   a piston movable relative to the chamber linearly along an axis to draw fluid into the chamber when the piston is moved in a first direction and to discharge fluid from the chamber when the piston is moved linearly in a second direction opposite the first direction, the piston further rotatable to a plurality of rotational positions about the axis at a single axial position of the piston, each of the plurality of rotational positions of the piston configured to limit a distance the piston can move relative to the chamber; and
   a member engaged with the piston in each of the plurality of rotational positions and configured to control both the rotational position of the piston and the distance the piston can move in the first direction and the second direction relative to the chamber,
   wherein, in at least one of the plurality of rotational positions, the piston is substantially immovable any distance.

10. The fluid dispenser of claim 9, further comprising a user-manipulatable control coupled to the piston to rotate the piston between the plurality of rotational positions and to move the piston in the first direction and the second direction.

11. The fluid dispenser of claim 9, wherein the piston is rotatable to each of the plurality of rotational positions about the axis at a single vertical position of the piston.

12. The fluid dispenser of claim 9, wherein at least a portion of the piston is changeable to provide at least one rotational position that limits the distance the piston can move relative to the chamber, and wherein the distance associated with the at least one rotational position is different from the distances associated with the plurality of rotational positions.

13. The fluid dispenser of claim 9, wherein each of the plurality of rotational positions aligns with a corresponding elongated aperture extending along the axis.

14. The fluid dispenser of claim 9, wherein the member is configured to inhibit movement in the second direction prior to the piston being moved a predetermined distance in the first direction.

15. A fluid dispenser for containing and dispensing metered amounts of fluid, the fluid dispenser comprising:
  a reservoir configured to contain fluid;
  a chamber positioned in fluid communication with the reservoir for containing a quantity of the fluid;
  a first type of piston movable relative to the chamber to draw fluid into the chamber when the piston is moved in a first direction, and to discharge fluid from the chamber when the first type of piston is moved in a second direction opposite the first direction, the first type of piston having a first rotational position configured to draw a first predetermined amount of fluid into the chamber and a second first rotational position configured to draw a second predetermined amount of fluid into the chamber,
  wherein the first type of piston is at least partially changeable to provide a second type of piston having a plurality of rotational positions, and
  wherein at least one of the plurality of rotational positions of the second type of piston is configured to draw a different predetermined amount of fluid into the chamber relative to the first and second predetermined amounts of fluid.

16. The fluid dispenser of claim 15, wherein the first type of piston includes a piston and a first piston component, and the second type of piston includes the piston and a second piston component that is different from the first piston component, and wherein the first piston component is replaceable with the second piston component.

17. The fluid dispenser of claim 16, wherein the first piston component and the second piston component have one or more of different numbers of apertures, different aperture lengths, and different aperture positions corresponding to different rotational positions and predetermined amounts of fluid configured to be drawn in to the chamber.

18. The fluid dispenser of claim 15, wherein the first type of piston and the second type of piston have one or more of different numbers of apertures, different aperture lengths, and different aperture positions corresponding to different rotational positions and predetermined amounts of fluid configured to be drawn in to the chamber.

19. The fluid dispenser of claim 15, wherein the first type of piston has a third rotational position configured to inhibit movement of the piston in the first direction.

20. The fluid dispenser of claim 15, wherein one of the plurality of rotational positions of the second type of piston is configured to inhibit movement of the piston in the first direction.

21. A fluid dispenser for containing and dispensing metered amounts of fluid, the fluid dispenser comprising:
  a reservoir configured to contain fluid;
  a chamber positioned in fluid communication with the reservoir for containing a quantity of the fluid;
  a piston movable relative to the chamber linearly along an axis to draw fluid into the chamber when the piston is moved in a first direction and to discharge fluid from the chamber when the piston is moved linearly in a second direction opposite the first direction, the piston further rotatable to a plurality of rotational positions about the axis, each of the plurality of rotational positions of the piston configured to limit a distance the piston can move relative to the chamber; and
  a member engaged with the piston in each of the plurality of rotational positions and configured to control both the rotational position of the piston and the distance the piston can move in the first direction and the second direction relative to the chamber,
  wherein the member is configured to inhibit movement in the second direction prior to the piston being moved a predetermined distance in the first direction.

* * * * *